US 11,379,875 B2

(12) United States Patent
MacDougall et al.

(10) Patent No.: US 11,379,875 B2
(45) Date of Patent: Jul. 5, 2022

(54) SYSTEMS AND METHODS FOR TIME-BASED ADVERTISING

(71) Applicant: AT&T Intellectual Property I, L.P., Atlanta, GA (US)

(72) Inventors: Alexander MacDougall, Newnan, GA (US); Anna Lidzba, Atlanta, GA (US); Nigel Bradley, Canton, GA (US); James Carlton Bedingfield, Sr., Gainesville, GA (US); Ari Craine, Marietta, GA (US); Robert Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/863,453

(22) Filed: Apr. 30, 2020

(65) Prior Publication Data
US 2021/0342884 A1    Nov. 4, 2021

(51) Int. Cl.
*G06Q 30/00* (2012.01)
*G06Q 30/02* (2012.01)
(Continued)

(52) U.S. Cl.
CPC ......... *G06Q 30/0255* (2013.01); *G06N 20/00* (2019.01); *G06Q 30/0641* (2013.01)

(58) Field of Classification Search
CPC . G06Q 30/0255; G06Q 30/0641; G06N 20/00
See application file for complete search history.

(56) References Cited

U.S. PATENT DOCUMENTS 6,943,672 B2    9/2005  Choi
6,965,871 B1   11/2005  Szabo et al.
(Continued)

FOREIGN PATENT DOCUMENTS

JP    2006151269 A    6/2006

OTHER PUBLICATIONS

- "EasyMall—An Interactive Virtual Shopping System". IEEE. 2008. (Year: 2008).*
(Continued)

*Primary Examiner* — Maria V Vanderhorst
(74) *Attorney, Agent, or Firm* — Guntin & Gust, PLC; Atanu Das

(57) ABSTRACT

Aspects of the subject disclosure may include, for example, storing, in a database, information associated with a first item purchased by a user, the information comprising an identification of the first item and a time of purchase of the first item; receiving web browsing data based upon monitoring, by another device, web browsing of the user; determining, based upon the web browsing data that is received, whether the user is currently browsing at a shopping website, resulting in a determination; responsive to the determination being that the user is currently browsing at the shopping website, querying the database to determine an elapsed time since the time of purchase of the first item; responsive to the elapsed time meeting a threshold, generating a message to send to the another device monitoring the web browsing, the message informing the user of a suggested second item for the buyer to purchase, the suggested second item being a replacement for the first item; and sending the message to the another device for presentation to the user. Other embodiments are disclosed.

20 Claims, 22 Drawing Sheets

(51) Int. Cl.
  *G06N 20/00* (2019.01)
  *G06Q 30/06* (2012.01)
  *G05B 19/418* (2006.01)

(56) References Cited

U.S. PATENT DOCUMENTS

| | | | |
|---|---|---|---|
| 7,299,982 | B2 | 11/2007 | Kreiner |
| 7,362,228 | B2 | 4/2008 | Nycz |
| 7,367,496 | B2 | 5/2008 | Karstens |
| 7,426,479 | B2 | 9/2008 | Otto |
| 7,827,846 | B2 | 11/2010 | Bauchot |
| 7,931,197 | B2 | 4/2011 | Brandt |
| 8,086,503 | B1 | 12/2011 | Mussman et al. |
| 8,284,056 | B2 | 10/2012 | McTigue |
| 9,449,323 | B2 | 9/2016 | Mikan et al. |
| 10,198,751 | B2 | 2/2019 | Mikan et al. |
| 10,402,862 | B2 | 9/2019 | Mikan et al. |
| 2001/0049890 | A1 | 12/2001 | Hirsch et al. |
| 2002/0053076 | A1 | 5/2002 | Landesmann |
| 2002/0133407 | A1 | 9/2002 | Walker et al. |
| 2002/0161652 | A1 | 10/2002 | Paulin et al. |
| 2002/0198795 | A1 | 12/2002 | Dorenbosch |
| 2006/0119481 | A1 | 6/2006 | Tethrake et al. |
| 2006/0152377 | A1 | 7/2006 | Beebe et al. |
| 2007/0011135 | A1 | 1/2007 | Chitgupakar et al. |
| 2007/0063029 | A1 | 3/2007 | Brandt et al. |
| 2007/0164140 | A1 | 7/2007 | Dreimann |
| 2008/0106762 | A1 | 5/2008 | Mullender et al. |
| 2008/0254944 | A1 | 10/2008 | Muri et al. |
| 2009/0138328 | A1 | 5/2009 | Higgins et al. |
| 2009/0267783 | A1 | 10/2009 | Vock et al. |
| 2009/0278707 | A1 | 11/2009 | Biggins et al. |
| 2010/0141457 | A1 | 6/2010 | Wass et al. |
| 2010/0161379 | A1 | 6/2010 | Bene et al. |
| 2011/0093324 | A1 | 4/2011 | Fordyce, III et al. |
| 2011/0093327 | A1 | 4/2011 | Fordyce, III et al. |
| 2011/0113051 | A1 | 5/2011 | Lindahl et al. |
| 2011/0202405 | A1 | 8/2011 | Clark et al. |
| 2011/0231250 | A1 | 9/2011 | Elbaum et al. |
| 2011/0260834 | A1 | 10/2011 | Chapman et al. |
| 2011/0320441 | A1 | 12/2011 | Lee et al. |
| 2012/0096358 | A1* | 4/2012 | Barnes, Jr. ............. G06Q 30/08 715/728 |
| 2012/0123674 | A1 | 5/2012 | Perks et al. |
| 2012/0166284 | A1 | 6/2012 | Tseng et al. |
| 2012/0190386 | A1 | 7/2012 | Anderson |
| 2012/0203647 | A1 | 8/2012 | Smith et al. |
| 2013/0024301 | A1 | 1/2013 | Mikan et al. |
| 2013/0030822 | A1 | 1/2013 | Mikan et al. |
| 2013/0041758 | A1 | 2/2013 | Mikan et al. |
| 2013/0041759 | A1 | 2/2013 | Mikan et al. |
| 2013/0103551 | A1* | 4/2013 | Tedesco ................ G06Q 30/06 705/27.1 |
| 2013/0103634 | A1 | 4/2013 | Jojic et al. |
| 2014/0012680 | A1* | 1/2014 | Puckett ............. G06Q 30/0255 705/14.66 |
| 2014/0067596 | A1 | 3/2014 | Mcgovern et al. |
| 2016/0253710 | A1* | 9/2016 | Publicover ......... H04N 21/4532 705/14.66 |
| 2016/0300144 | A1 | 10/2016 | Santhanam et al. |
| 2016/0358223 | A1 | 12/2016 | Mikan et al. |
| 2017/0178218 | A1* | 6/2017 | Feris ................ G06Q 30/0631 |
| 2018/0218428 | A1 | 8/2018 | Xie et al. |
| 2019/0139093 | A1 | 5/2019 | Mikan et al. |
| 2021/0342925 | A1 | 11/2021 | Macdougall et al. |

OTHER PUBLICATIONS

"Definition of "equivalent"", Collins English Dictionary—Complete & Unabridged 10th Edition, Source Location: HarperCollins Publishers, http://dictionary.reference.com/browse/equivalent. Available: http://dictionary.reference.com., Mar. 5, 2014.
"Definition of "quality" as "value" and vice versa", https :/ /www. goog le.com/search ?q=+qu al ity +syno nyms&sou rce id=ie 7 & rls=co m. microsoft: en-US: I E-Search Box& ie=&oe=, Mar. 5, 2014.
"Definition of "to replace"", Dictionary.com, unabridged, Source Location: Random House, http://dictionary.reference.com/browse/replace. Available: http://dictionary.reference.com, Mar. 5, 2014.
Saygin, "Adaptive inventory management using RFID data", 2006, 7 pages.

* cited by examiner

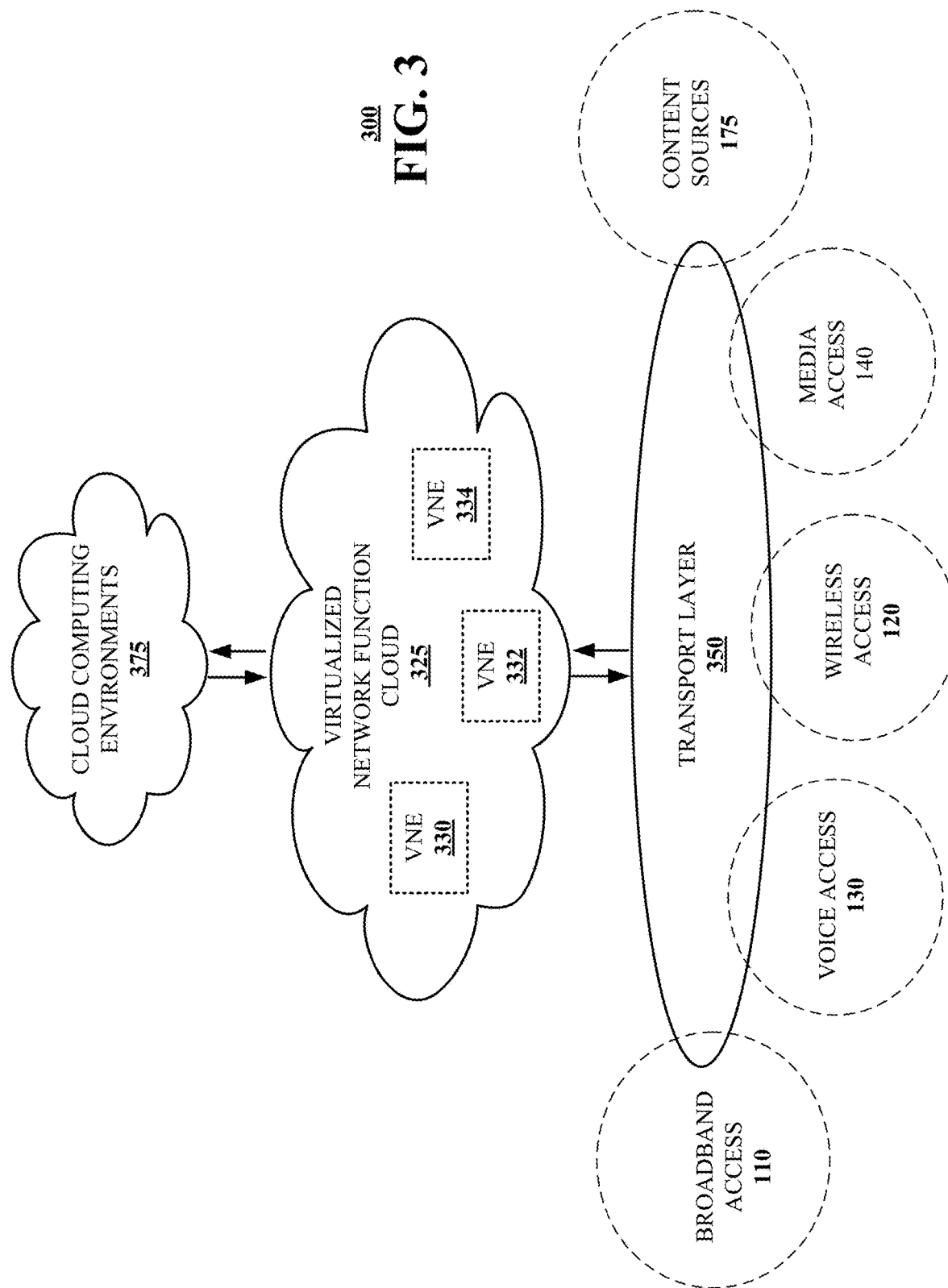

SYSTEMS AND METHODS FOR TIME-BASED ADVERTISING

FIELD OF THE DISCLOSURE

The subject disclosure relates to systems and methods for time-based advertising.

BACKGROUND

Various conventional websites provide shopping suggestions based, for example, upon past purchase history.

BRIEF DESCRIPTION OF THE DRAWINGS

Reference will now be made to the accompanying drawings, which are not necessarily drawn to scale, and wherein:

FIG. 2O depicts an illustrative embodiment of a method in accordance with various aspects described herein.

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for providing shopping assistance (e.g., virtual shopping assistance). Other embodiments are described in the subject disclosure.

As described herein, various embodiments provide mechanisms for a user to receive proactive assistance (e.g., proactive shopping assistance). In one example, proactive assistance can be provided to a user by a virtual assistant while the user is shopping online. In one specific example, such a virtual assistant can comprise a computer program with artificial intelligence and/or machine leaning. In another specific example, such a virtual assistant can monitor the user's web activity and provide to the user pertinent information using a parallel speech-based communication session that complements the online screen session of the user.

As described herein, various embodiments provide mechanisms for projecting a user's needs for products in the future based on one or more past purchases and/or based on one or more other factors. In one specific example, advertisements can be sent to the user accordingly.

Figure 1:
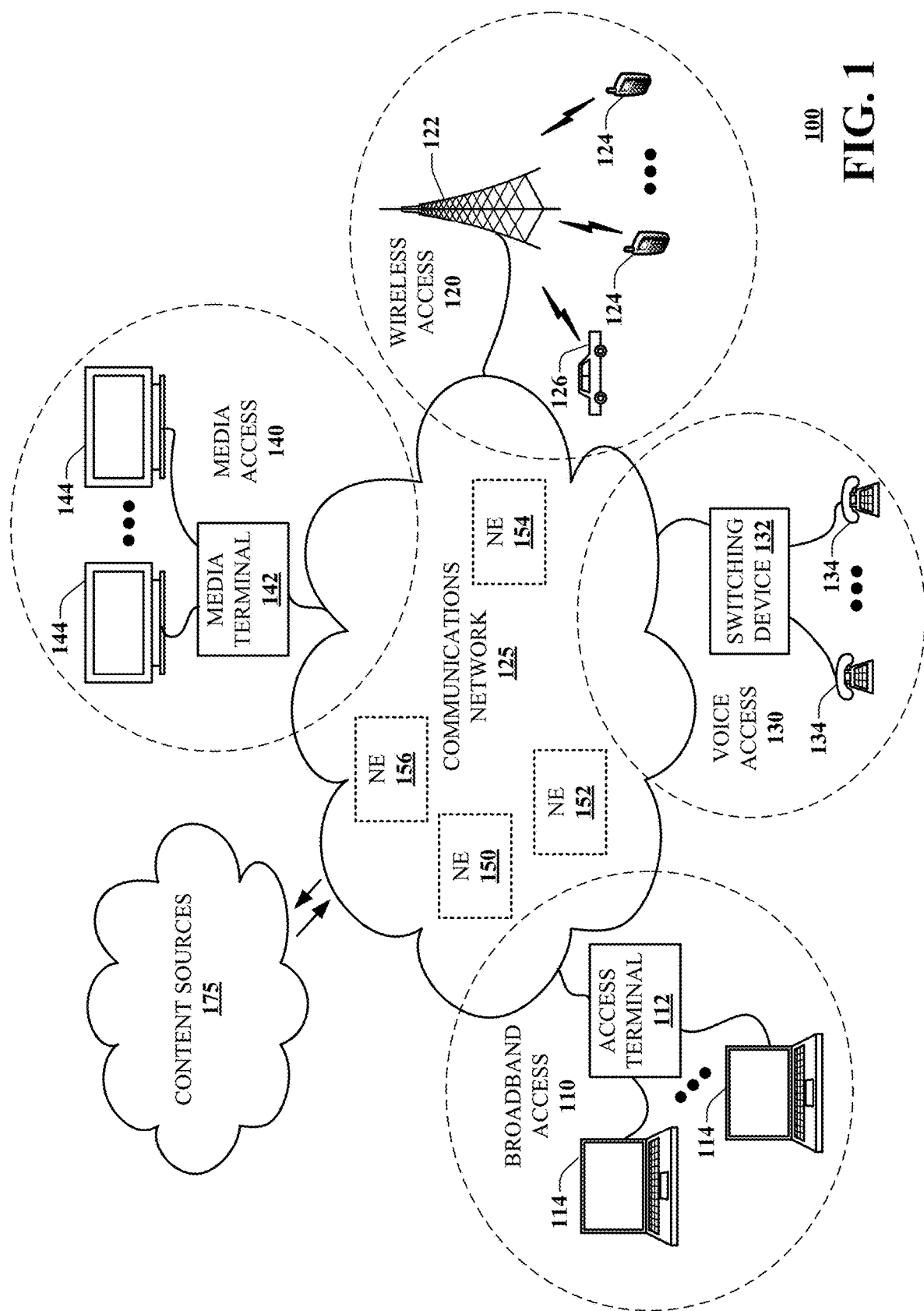
FIG. 1 is a block diagram illustrating an example, non-limiting embodiment of a communication network in accordance with various aspects described herein.

Referring now to FIG. 1, a block diagram is shown illustrating an example, non-limiting embodiment of a communication network 100 in accordance with various aspects described herein. For example, communication network 100 can facilitate in whole or in part storage of personal inventory data and/or provision of shopping suggestions as described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
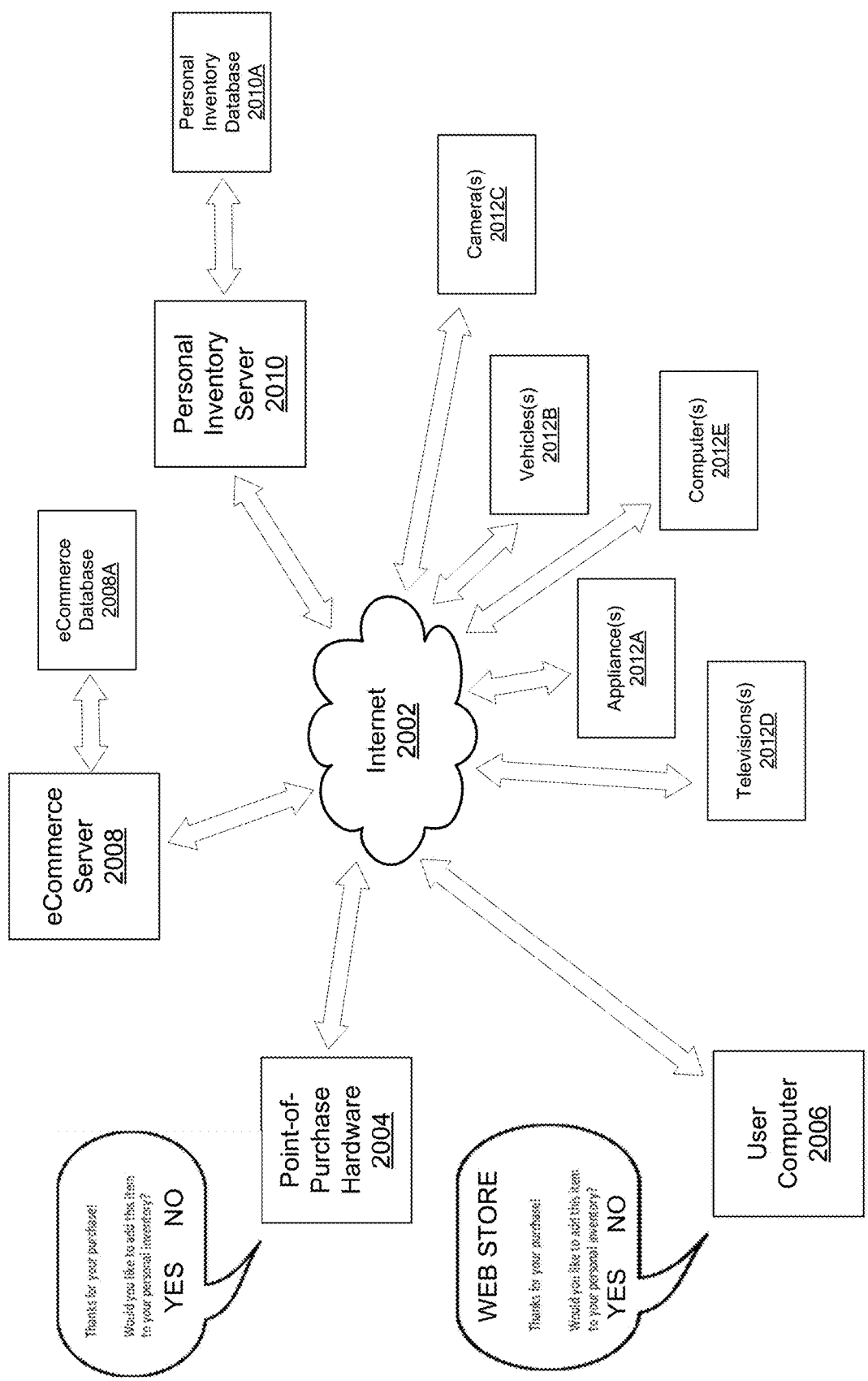
FIG. 2A is a block diagram illustrating an example, non-limiting embodiment of a system (all or part of which can, for example, function within the communication network of FIG. 1) in accordance with various aspects described herein (this FIG. 2A shows examples of a purchase of one item (sometimes referred to herein instead as a product) at a physical point-of-purchase and purchase of another item via a website).

Referring now to FIG. 2A, this is a block diagram illustrating an example, non-limiting embodiment of a system 2000 in accordance with various aspects described herein. In this example, system 2000 includes eCommerce Server 2008 (which is in operative bi-directional communication with eCommerce Database 2008A). The eCommerce Server 2008 is in operative bi-directional communication via the Internet 2002 with various other elements described herein. Further, system 2000 includes Personal Inventory Server 2010 (which is in operative bi-directional communication with Personal Inventory Database 2010A). The Personal Inventory Server 2010 is in operative bi-directional communication via the Internet 2002 with various other elements described herein. Further still, system 2000 includes Point-Of-Purchase Hardware 2004 (e.g., cash register, credit/debit card reader, electronic wallet reader, etc.). Point-Of-Purchase Hardware 2004 is in operative bi-directional communication via the Internet 2002 with various other elements described herein. In this example, the Point-Of-Purchase Hardware 2004 is used (in response to a buyer (not shown) purchasing a first item) to query the buyer as to whether the buyer wishes to add the first item to the buyer's personal inventory (stored in the Personal Inventory Database 2010A). This query can be presented to the buyer, for example, visually via a GUI display screen of the Point-Of-Purchase Hardware 2004, audibly via a speaker of the Point-Of-Purchase Hardware 2004, or a combination thereof. The buyer can respond to this query, for example, via a GUI display screen of the Point-Of-Purchase Hardware 2004, audibly via a microphone of the Point-Of-Purchase Hardware 2004, or a combination thereof. In another embodiment, the buyer can receive the query via tablet, smartphone or the like while at the point-of-sale and the buyer can response to the query via the tablet, smartphone or the like. Further still, system 2000 includes User Computer 2006 (e.g., desktop computer, laptop computer, tablet, smartphone, etc.). User Computer 2006 is in operative bi-directional communication via the Internet 2002 with various other elements described herein. In this example, the User Computer 2006 is used (in response to a buyer (not shown) purchasing a second item via a website of a merchant) to query the buyer (which may be the same buyer as mentioned above in connection with the purchase of the first item or which may be a different buyer) as to whether the buyer wishes to add the second item to the buyer's personal inventory (stored in the Personal Inventory Database 2010A). This query can be presented to the buyer, for example, visually via a GUI display screen of the User Computer 2006, audibly via a speaker of the User Computer 2006, or a combination thereof. The buyer can respond to this query, for example, via a GUI display screen of the User Computer 2006, audibly via a microphone of the User Computer 2006, or a combination thereof. Further still, system 2000 includes Appliance(s) 2012A, Vehicle(s) 2012B, Camera(s) 2012C, Television(s) 2012D, Computer(s) 2012E, and any other similar device(s). These Appliance(s) 2012A, Vehicle(s) 2012B, Camera(s) 2012C, Television(s) 2012D, Computer(s) 2012E, and any other similar device(s) are in operative bi-directional communication via the Internet 2002 with various other elements described herein. In one specific example, some or all of these Appliance(s) 2012A, Vehicle(s) 2012B, Camera(s) 2012C, Television(s) 2012D, Computer(s) 2012E, and any other similar device(s) can be Internet-Of-Things (IOT) devices and can provide (such as upon being queried) their respective identification information (e.g., manufacturer, model, serial number, specifications).

Figure 2B:
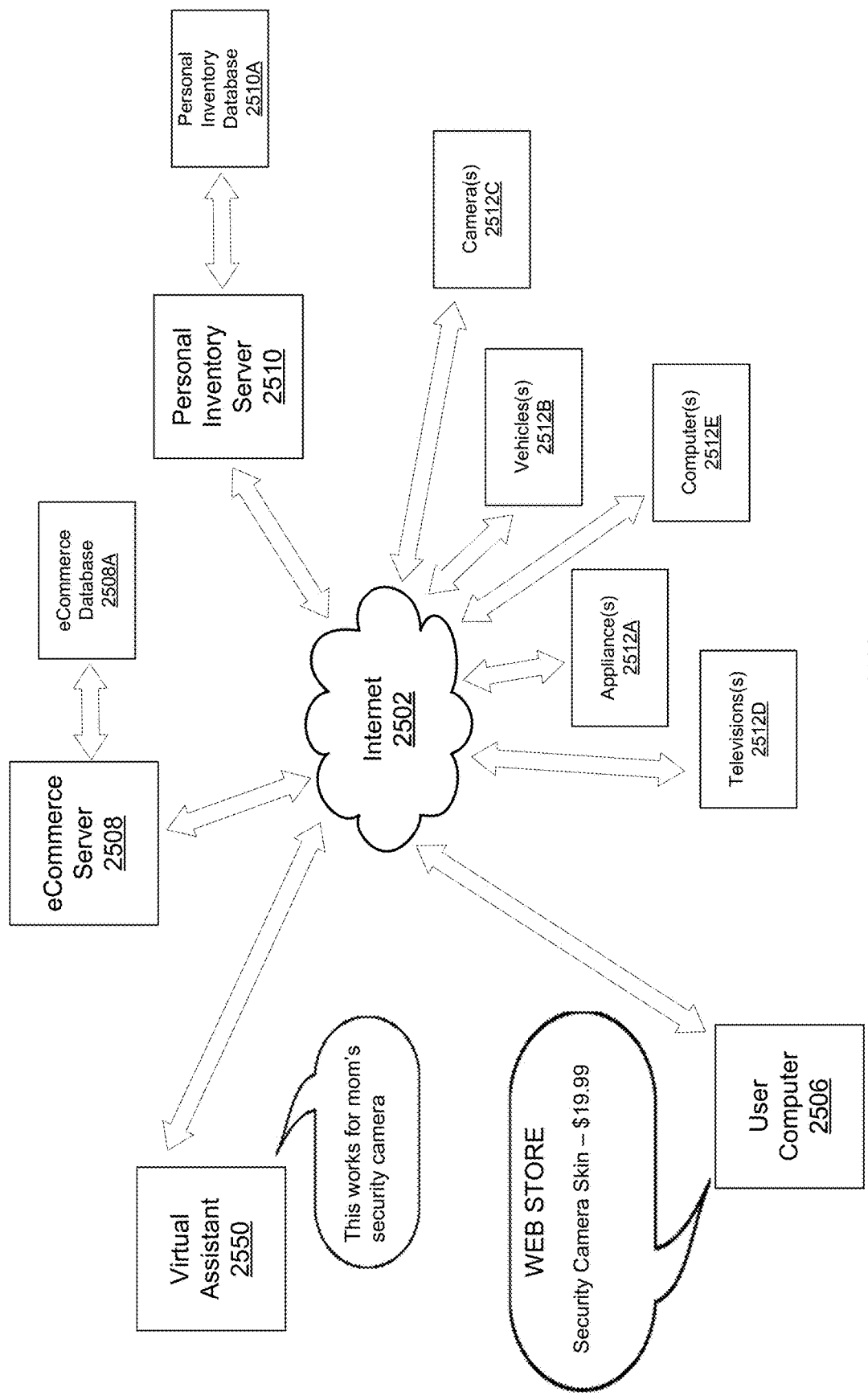
FIG. 2B is a block diagram illustrating an example, non-limiting embodiment of a system (all or part of which can, for example, function within the communication network of FIG. 1) in accordance with various aspects described herein (this FIG. 2B shows an example of a suggestion to purchase an item that is compatible with another item).

Referring now to FIG. 2B, this is a block diagram illustrating an example, non-limiting embodiment of a system 2500 in accordance with various aspects described herein. In this example, system 2500 includes eCommerce Server 2508 and eCommerce Database 2508A (which can operate in a manner similar to eCommerce Server 2008 and eCommerce Database 2008A of FIG. 2A). Further, system 2500 includes Personal Inventory Server 2510 and Personal Inventory Database 2510A (which can operate in a manner similar to Personal Inventory Server 2010 and Personal Inventory Database 2010A of FIG. 2A). Further still, system 2500 includes Appliance(s) 2512A, Vehicle(s) 2512B, Camera(s) 2512C, Television(s) 2512D, Computer(s) 2512E, and any other similar device(s) (which can operate in a manner similar to Appliance(s) 2012A, Vehicle(s) 2012B, Camera(s) 2012C, Television(s) 2012D, Computer(s) 2012E, and any other similar device(s) of FIG. 2A). Further still, system 2500 includes User Computer 2506 (e.g., desktop computer, laptop computer, tablet, smartphone, etc.). This User Computer 2506 can operate in a manner similar to user Computer 2006 of FIG. 2A. In this example, the user (not shown) has utilized User Computer 2506 to navigate to a product sale website (shown as "WEB STORE") and to browse a product (in this example, a particular "Security Camera Skin"). Further still, system 2500 includes Virtual Assistant 2550. Virtual Assistant 2550 is in operative bi-directional communication via the Internet 2502 with various other elements described herein. In this example, the Virtual Assistant 2550 outputs a message to the user (responsive to the user browsing the "Security Camera Skin" as mentioned above) that the "Security Camera Skin" works with the security camera of the user's mother. The output from the Virtual Assistant 2550 can be presented to the user, for example, visually via a GUI display screen of the Virtual Assistant 2550, audibly via a speaker of the Virtual Assistant 2550, or a combination thereof. In this example, the Virtual Assistant 2550 is shown as a stand-alone device (which interfaces with, for example, the eCommerce Server 2508 and/or the Personal Inventory Server 2510 to provide the functionality described herein). In various examples, the Virtual Assistant 2550 can comprise hardware, software, firmware, or any combination thereof. In another example, the Virtual Assistant 2550 can be integrated into one or more other devices. In one specific example, the Virtual Assistant 2550 can be integrated into the User Computer 2506.

Figure 2C:
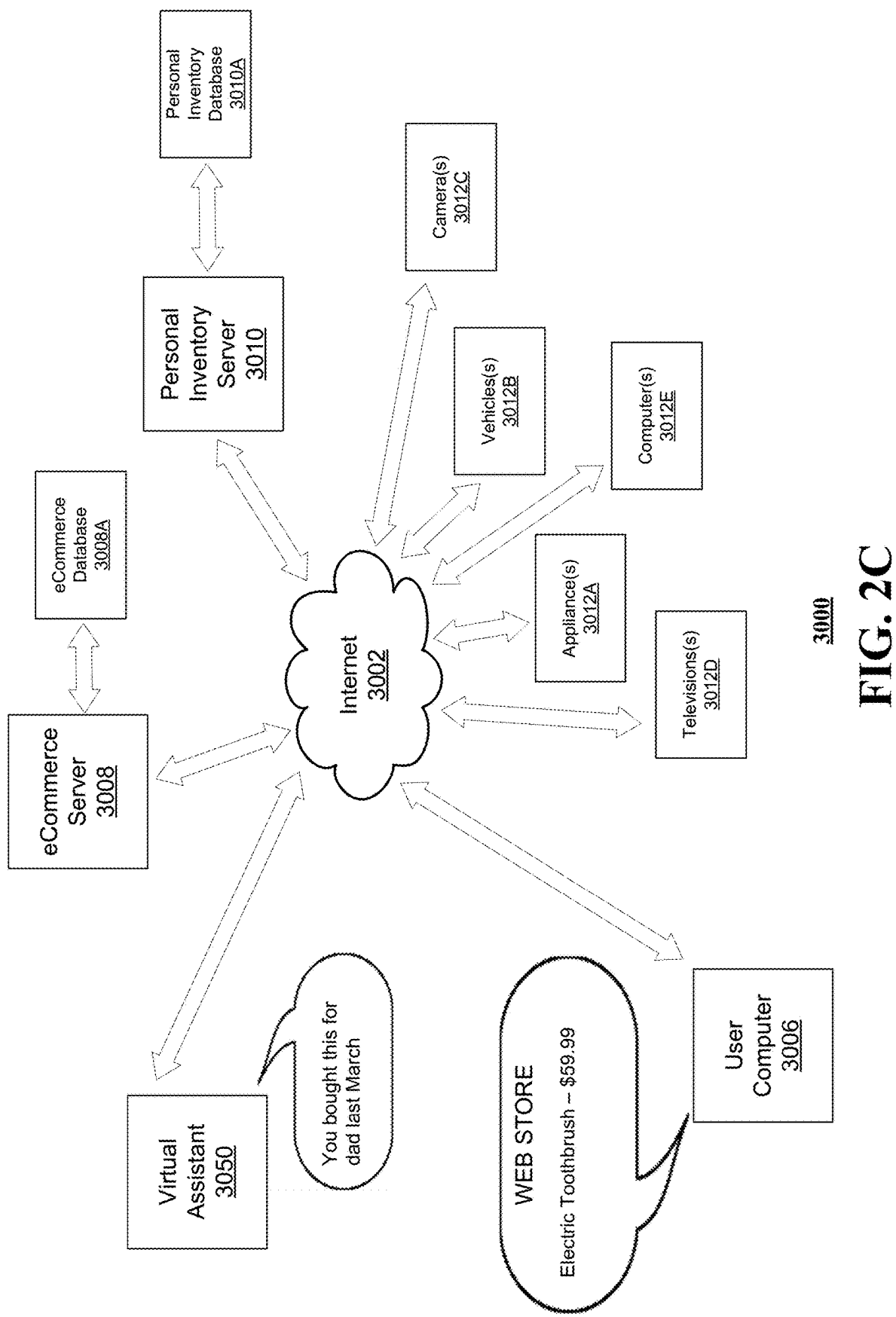
FIG. 2C is a block diagram illustrating an example, non-limiting embodiment of a system (all or part of which can, for example, function within the communication network of FIG. 1) in accordance with various aspects described herein (this FIG. 2C shows an example of information that is provided to a user based upon a prior purchase by the user).

Referring now to FIG. 2C, this is a block diagram illustrating an example, non-limiting embodiment of a system 3000 in accordance with various aspects described herein. In this example, system 3000 includes eCommerce Server 3008 and eCommerce Database 3008A (which can operate in a manner similar to eCommerce Server 2008 and eCommerce Database 2008A of FIG. 2A). Further, system 3000 includes Personal Inventory Server 3010 and Personal Inventory Database 3010A (which can operate in a manner similar to Personal Inventory Server 2010 and Personal Inventory Database 2010A of FIG. 2A). Further still, system 3000 includes Appliance(s) 3012A, Vehicle(s) 3012B, Camera(s) 3012C, Television(s) 3012D, Computer(s) 3012E, and any other similar device(s) (which can operate in a manner similar to Appliance(s) 2012A, Vehicle(s) 2012B, Camera(s) 2012C, Television(s) 2012D, Computer(s) 2012E, and any other similar device(s) of FIG. 2A). Further still, system 3000 includes User Computer 3006 (e.g., desktop computer, laptop computer, tablet, smartphone, etc.). This User Computer 3006 can operate in a manner similar to User Computer 2006 of FIG. 2A. In this example, the user (not shown) has utilized User Computer 3006 to navigate to a product sale website (shown as "WEB STORE") and to browse a product (in this example, a particular "Electric Toothbrush"). Further still, system 3000 includes Virtual Assistant 3050. This Virtual Assistant 3050 operates in a manner similar to Virtual Assistant 2550 of FIG. 2B. In this example, the Virtual Assistant 3050 outputs a message to the user (responsive to the user browsing the "Electric Toothbrush" as mentioned above) that the "Electric Toothbrush" was purchased by the user last March for the user's father. The output from the Virtual Assistant 3050 can be presented to the user, for example, visually via a GUI display screen of the Virtual Assistant 3050, audibly via a speaker of the Virtual Assistant 3050, or a combination thereof. In this example, the Virtual Assistant 3050 is shown as a stand-alone device (which interfaces with, for example, the eCommerce Server 3008 and/or the Personal Inventory Server 3010 to provide the functionality described herein). In various examples, the Virtual Assistant 3050 can comprise hardware, software, firmware, or any combination thereof. In another example, the Virtual Assistant 3050 can be integrated into one or more other devices. In one specific example, the Virtual Assistant 3050 can be integrated into the User Computer 3006.

Figure 2D:
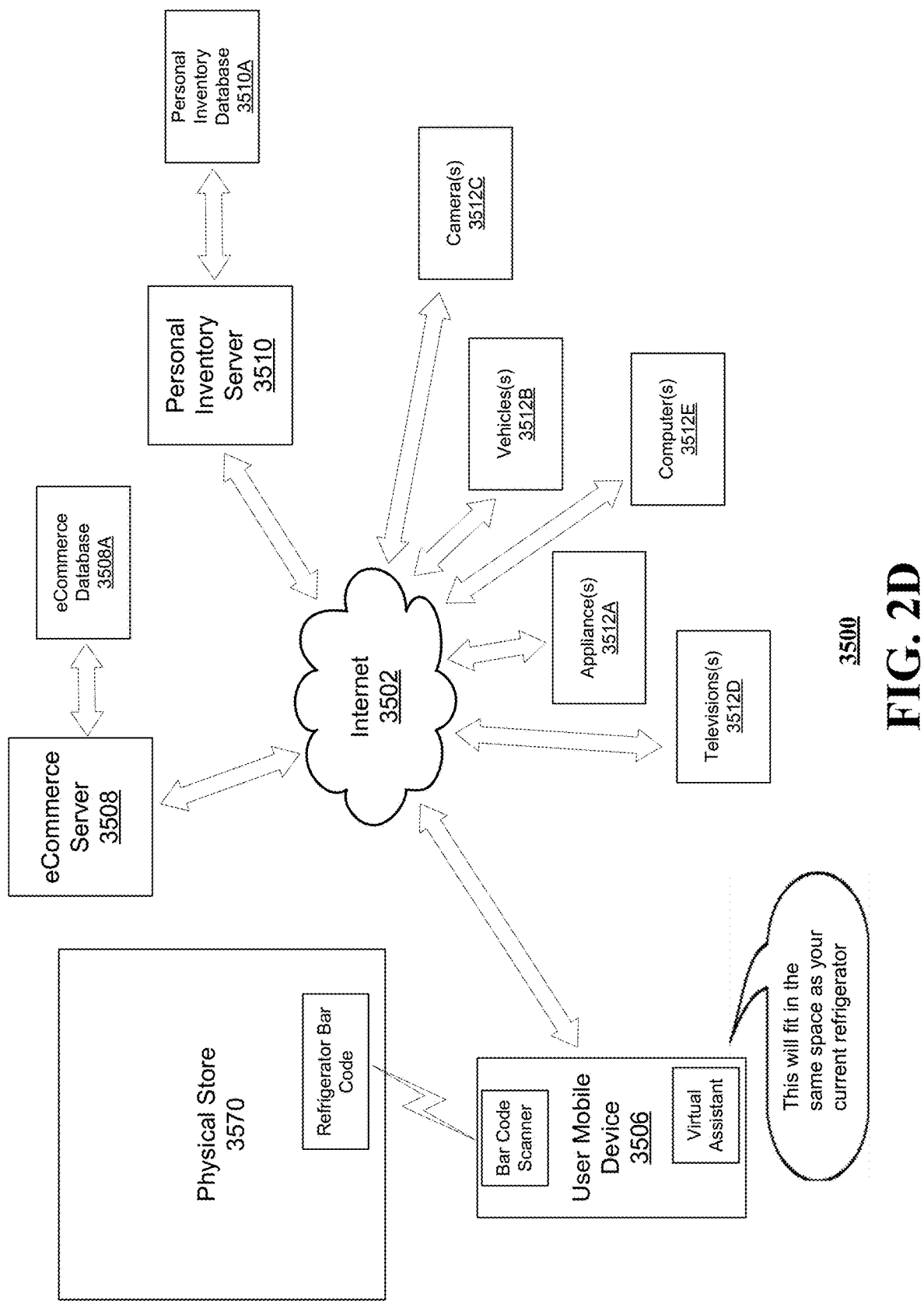
FIG. 2D is a block diagram illustrating an example, non-limiting embodiment of a system (all or part of which can, for example, function within the communication network of FIG. 1) in accordance with various aspects described herein (this FIG. 2D shows an example of information that is provided based upon one or more specifications of another item).

Referring now to FIG. 2D, this is a block diagram illustrating an example, non-limiting embodiment of a system 3500 in accordance with various aspects described herein. In this example, system 3500 includes eCommerce Server 3508 and eCommerce Database 3508A (which can operate in a manner similar to eCommerce Server 2008 and eCommerce Database 2008A of FIG. 2A). Further, system 3500 includes Personal Inventory Server 3510 and Personal Inventory Database 3510A (which can operate in a manner similar to Personal Inventory Server 2010 and Personal Inventory Database 2010A of FIG. 2A). Further still, system 3500 includes Appliance(s) 3512A, Vehicle(s) 3512B, Camera(s) 3512C, Television(s) 3512D, Computer(s) 3512E, and any other similar device(s) (which can operate in a manner similar to Appliance(s) 2012A, Vehicle(s) 2012B, Camera(s) 2012C, Television(s) 2012D, Computer(s) 2012E, and any other similar device(s) of FIG. 2A). Further still, system 3500 includes User Mobile Device 3506 (e.g., laptop computer, tablet, smartphone, etc.). This User Mobile Device 3506 is in operative bi-directional communication via the Internet 3502 with various other elements described herein. In this example, the User Mobile Device 3506 has integrated therein a Bar Code Scanner. Further, in this example, the User Mobile Device 3506 has integrated therein a Virtual Assistant. In this example, this integrated Virtual Assistant is in operative bi-directional communication via the Internet 3502 (through User Mobile Device 3506) with various other elements described herein. In this example, this integrated Virtual Assistant can provide the functionality of a virtual assistant as described herein. In this example shown in FIG. 2D, a user is at a physical store 3570. The user utilizes User Mobile Device 3506 to scan a bar code (in this example, a bar code of a refrigerator that the user is contemplating buying). In response to the scanning of the bar code, the Virtual Assistant informs the user that the refrigerator being considered for purchase will fit in the same space as the current refrigerator of the user. The output from the Virtual Assistant can be presented to the user, for example, visually via a GUI display screen of the User Mobile Device 3506, audibly via a speaker of the User Mobile Device 3506, or a combination thereof. In this example, the Virtual Assistant is shown as integrated into the User Mobile Device 3506. In another example, the Virtual Assistant can be a separate device. The Virtual Assistant can obtain information from, for example, the eCommerce Server 3508 and/or the Personal Inventory Server 3510 to make the fit/no-fit determination.

Figure 2E:
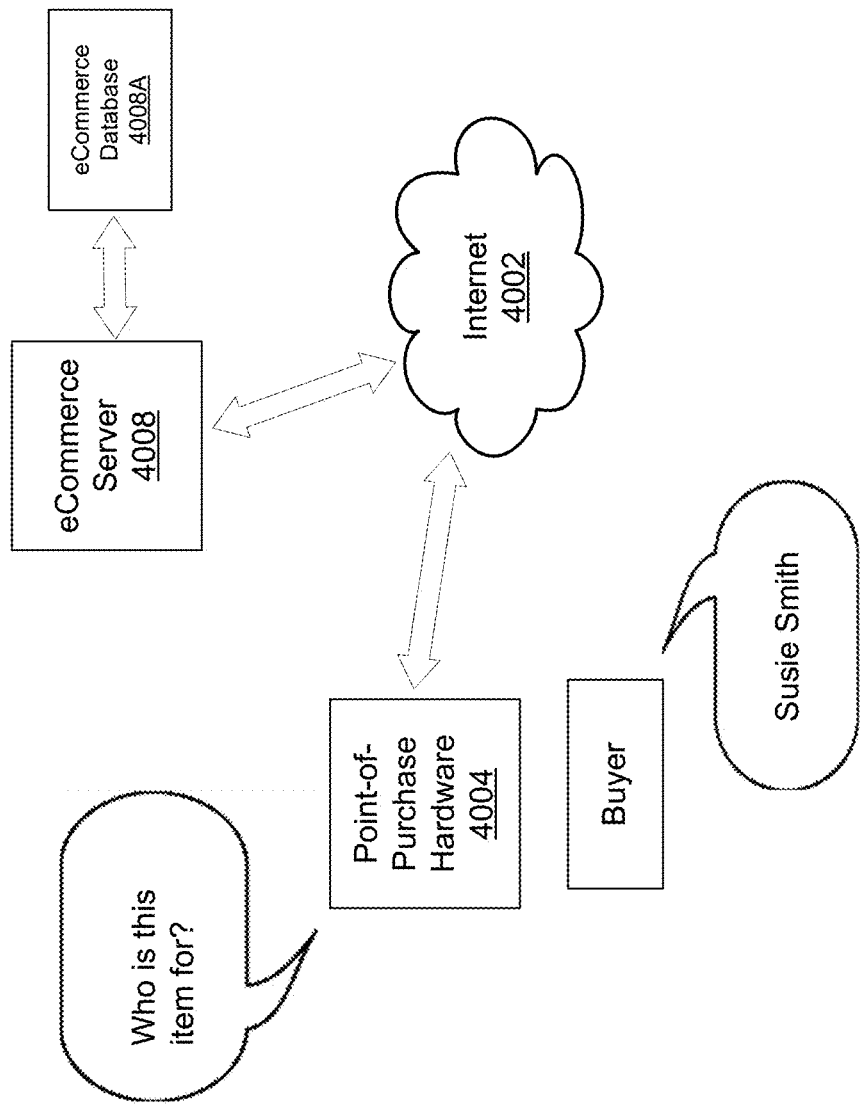
FIG. 2E is a block diagram illustrating an example, non-limiting embodiment of a system (all or part of which can, for example, function within the communication network of FIG. 1) in accordance with various aspects described herein (this FIG. 2E shows an example of storing information regarding a user of a product that is purchased by a buyer, wherein the information is obtained in connection with a physical point-of-purchase).

Referring now to FIG. 2E, this is a block diagram illustrating an example, non-limiting embodiment of a system 4000 in accordance with various aspects described herein. In this example, system 4000 includes eCommerce Server 4008 (which is in operative bi-directional communication with eCommerce Database 4008A). The eCommerce Server 4008 is in operative bi-directional communication via the Internet 4002 with various other elements described herein. Further, system 4000 includes Point-Of-Purchase Hardware 4004 (e.g., cash register, credit/debit card reader, electronic wallet reader, etc.). Point-Of-Purchase Hardware 4004 is in operative bi-directional communication via the Internet 4002 with various other elements described herein. In this example, the Point-Of-Purchase Hardware 4004 is used (in response to a buyer purchasing a first item) to query the buyer as to who the item is for. This query can be presented to the Buyer, for example, visually via a GUI display screen of the Point-Of-Purchase Hardware 4004, audibly via a speaker of the Point-Of-Purchase Hardware 4004, or a combination thereof. The Buyer can respond to this query, for example, visually via a GUI display screen of the Point-Of-Purchase Hardware 4004, audibly via a microphone of the Point-Of-Purchase Hardware 4004, or a combination thereof. In another embodiment, the Buyer can receive the query via tablet, smartphone or the like while at the point-of-sale and the Buyer can respond to the query via the tablet, smartphone or the like.

Figure 2F:
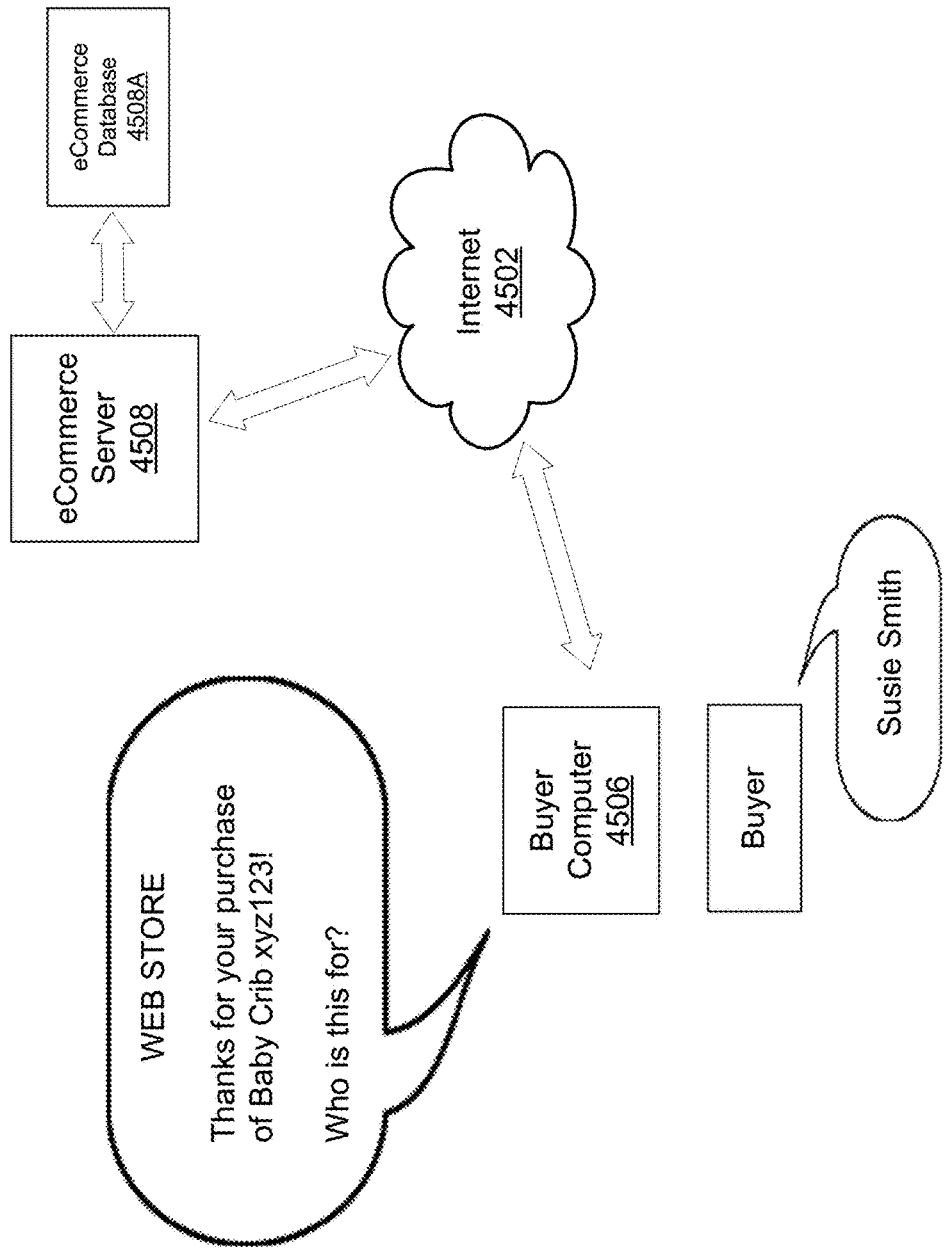
FIG. 2F is a block diagram illustrating an example, non-limiting embodiment of a system (all or part of which can, for example, function within the communication network of FIG. 1) in accordance with various aspects described herein (this FIG. 2F shows an example of storing information regarding a user of a product that is purchased by a buyer, wherein the information is obtained in connection with a purchase via a website).

Referring now to FIG. 2F, this is a block diagram illustrating an example, non-limiting embodiment of a system 4500 in accordance with various aspects described herein. In this example, system 4500 includes eCommerce Server 4508 and eCommerce Database 4508A (which can operate in a manner similar to eCommerce Server 4008 and eCommerce Database 4008A of FIG. 2E). Further, system 4500 includes Buyer Computer 4506 (e.g., desktop computer, laptop computer, tablet, smartphone, etc.). Buyer Computer 4506 is in operative bi-directional communication via the Internet 4502 with various other elements described herein. In this example, the Buyer Computer 4506 is used (in response to a Buyer purchasing a first item) to query the Buyer as to who the item is for. This query can be presented to the Buyer, for example, visually via a GUI display screen of the Buyer Computer 4506, audibly via a speaker of the Buyer Computer 4506, or a combination thereof. The Buyer can respond to this query, for example, visually via a GUI display screen of the Buyer Computer 4506, audibly via a microphone of the Buyer Computer 4506, or a combination thereof.

Figure 2G:
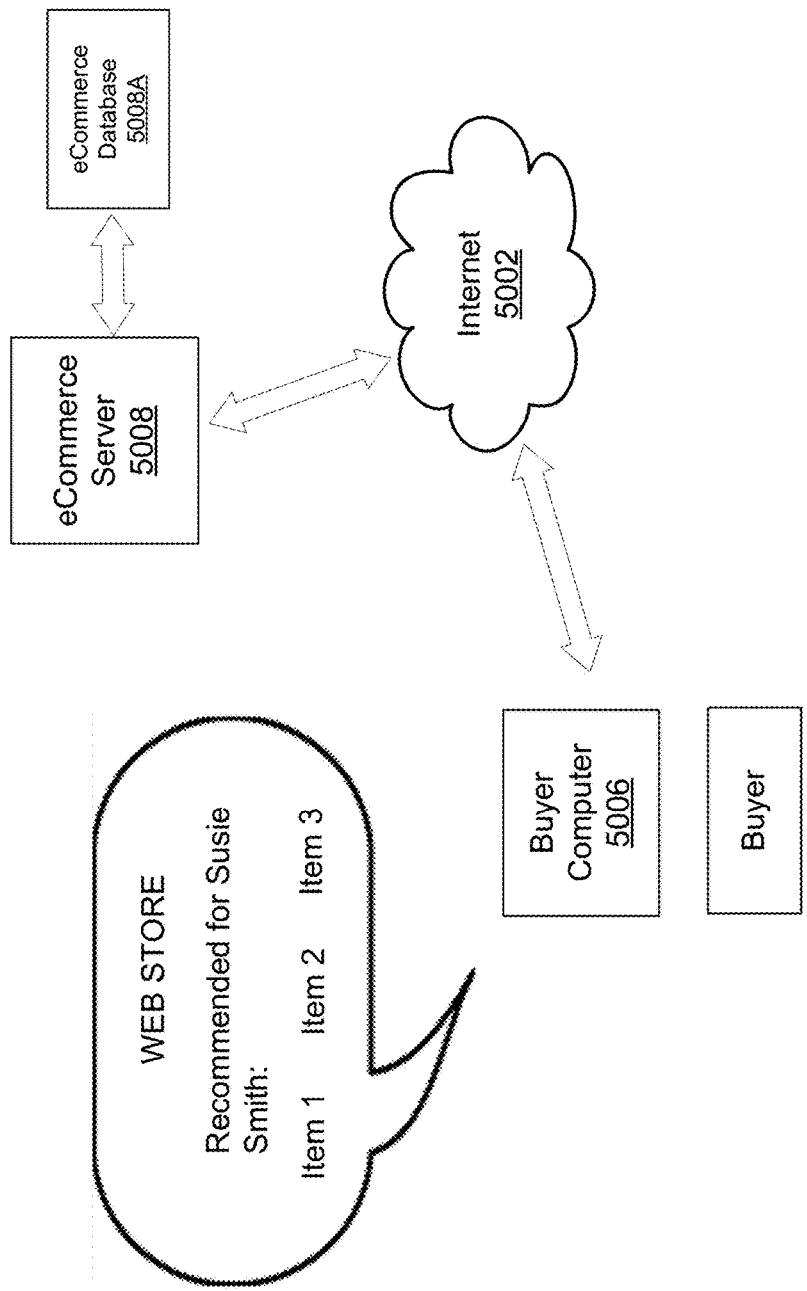
FIG. 2G is a block diagram illustrating an example, non-limiting embodiment of a system (all or part of which can, for example, function within the communication network of FIG. 1) in accordance with various aspects described herein (this FIG. 2G shows an example of a suggestion to purchase a product based on a current age of a user).

Referring now to FIG. 2G, this is a block diagram illustrating an example, non-limiting embodiment of a system 5000 in accordance with various aspects described herein. In this example, system 5000 includes eCommerce Server 5008 and eCommerce Database 5008A (which can operate in a manner similar to eCommerce Server 4008 and eCommerce Database 4008A of FIG. 2E). Further, system 5000 includes Buyer Computer 5006 (which can operate in a manner similar to Buyer Computer 4506 of FIG. 2F). In this example, Buyer Computer 5006 is used to present to the Buyer a new recommendation (e.g., a recommendation for a number of age-appropriate items for Suzie Smith (for whom the Buyer had previously purchased a baby crib). This recommendation can be presented to the Buyer, for example, visually via a GUI display screen of the Buyer Computer 5006, audibly via a speaker of the Buyer Computer 5006, or a combination thereof. The Buyer can respond to this recommendation, for example, by making a purchase.

Figure 2H:
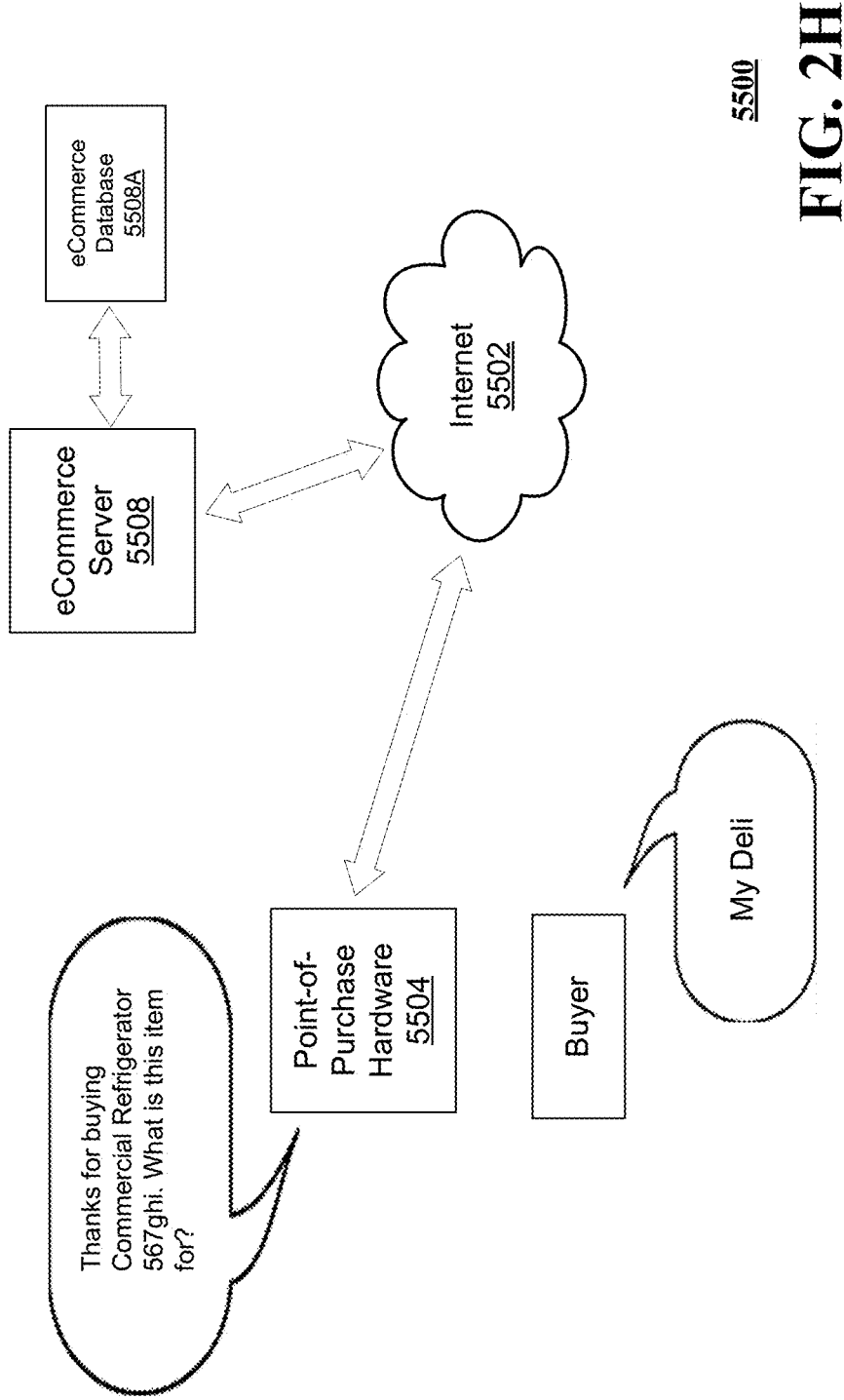
FIG. 2H is a block diagram illustrating an example, non-limiting embodiment of a system (all or part of which can, for example, function within the communication network of FIG. 1) in accordance with various aspects described herein (this FIG. 2H shows an example of storing information (such as planned usage location) regarding a product that is purchased by a buyer, wherein the information is obtained in connection with a physical point-of-purchase).

Referring now to FIG. 2H, this is a block diagram illustrating an example, non-limiting embodiment of a system 5500 in accordance with various aspects described herein. In this example, system 5500 includes eCommerce Server 5508 and eCommerce Database 5508A (which can operate in a manner similar to eCommerce Server 4008 and eCommerce Database 4008A of FIG. 2E). Further, system 5500 includes Point-Of-Purchase Hardware 5504 (which can operate in a manner similar to Point-Of-Purchase Hardware 4004 of FIG. 2E). In this example, the Point-Of-Purchase Hardware 5504 is used (in response to a Buyer purchasing a first item) to query the Buyer as to what is the item for. This query can be presented to the Buyer, for example, visually via a GUI display screen of the Point-Of-Purchase Hardware 5504, audibly via a speaker of the Point-Of-Purchase Hardware 5504, or a combination thereof. The Buyer can respond to this query, for example, via a GUI display screen of the Point-Of-Purchase Hardware 5504, audibly via a microphone of the Point-Of-Purchase Hardware 5504, or a combination thereof (see the response "My Deli"). In another embodiment, the Buyer can receive the query via tablet, smartphone or the like while at the point-of-sale and the Buyer can respond to the query via the tablet, smartphone or the like.

Figure 2I:
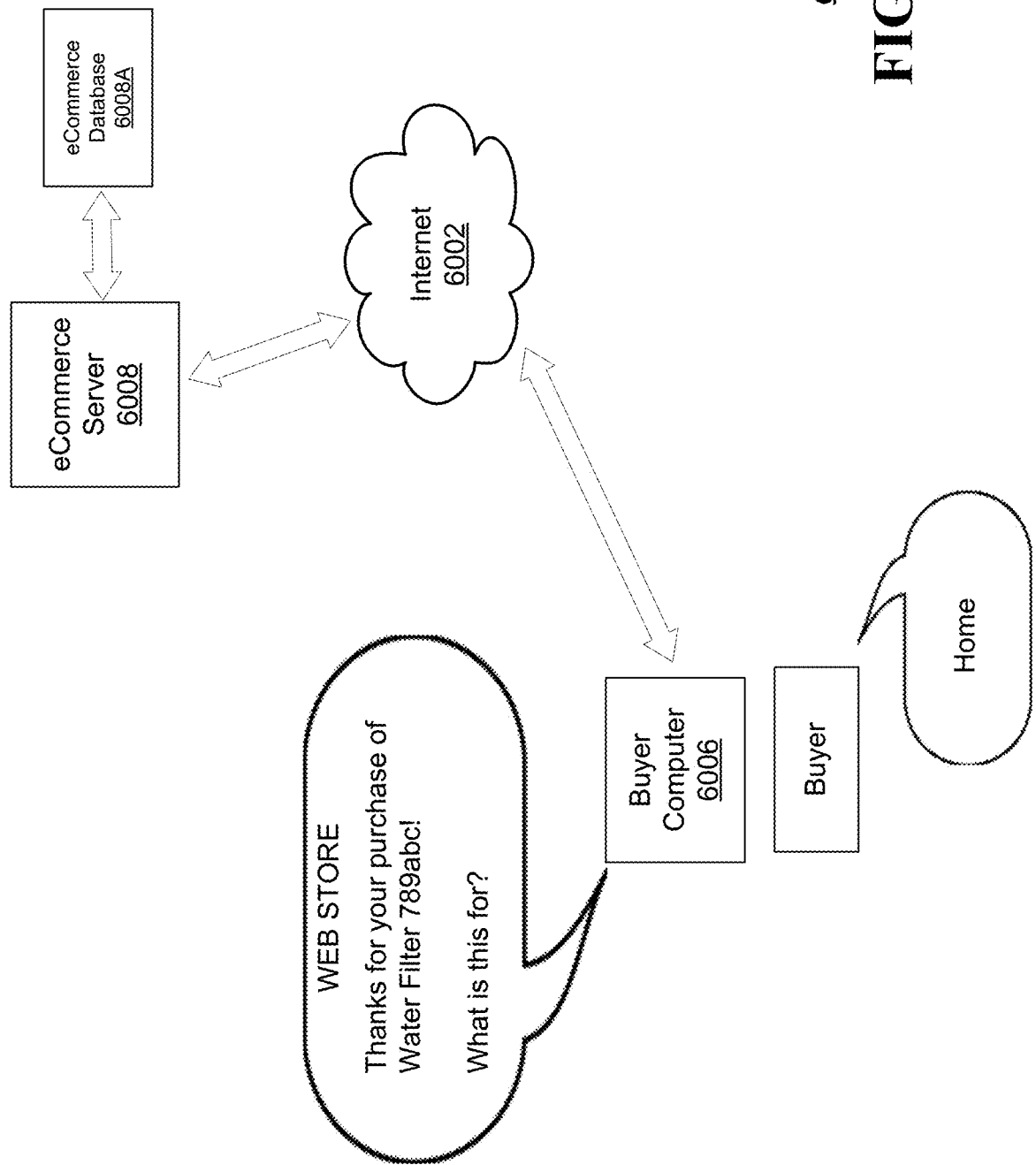
FIG. 2I is a block diagram illustrating an example, non-limiting embodiment of a system (all or part of which can, for example, function within the communication network of FIG. 1) in accordance with various aspects described herein (this FIG. 2I shows an example of storing information (such as planned usage location) regarding a product that is purchased by a buyer, wherein the information is obtained in connection with a purchase via a website).

Referring now to FIG. 2I, this is a block diagram illustrating an example, non-limiting embodiment of a system 6000 in accordance with various aspects described herein. In this example, system 6000 includes eCommerce Server 6008 and eCommerce Database 6008A (which can operate in a manner similar to eCommerce Server 4508 and eCommerce Database 4508A of FIG. 2F). Further, system 6000 includes Buyer Computer 6006 (which operates in a manner similar to Buyer Computer 4506 of FIG. 2F). In this example, the Buyer Computer 6006 is used (in response to a Buyer purchasing a first item) to query the Buyer as to what is the item for. This query can be presented to the Buyer, for example, visually via a GUI display screen of the Buyer Computer 6006, audibly via a speaker of the Buyer Computer 6006, or a combination thereof. The Buyer can respond to this query, for example, via a GUI display screen of the Buyer Computer 6006, audibly via a microphone of the Buyer Computer 6006, or a combination thereof (see the response "Home").

Figure 2J:
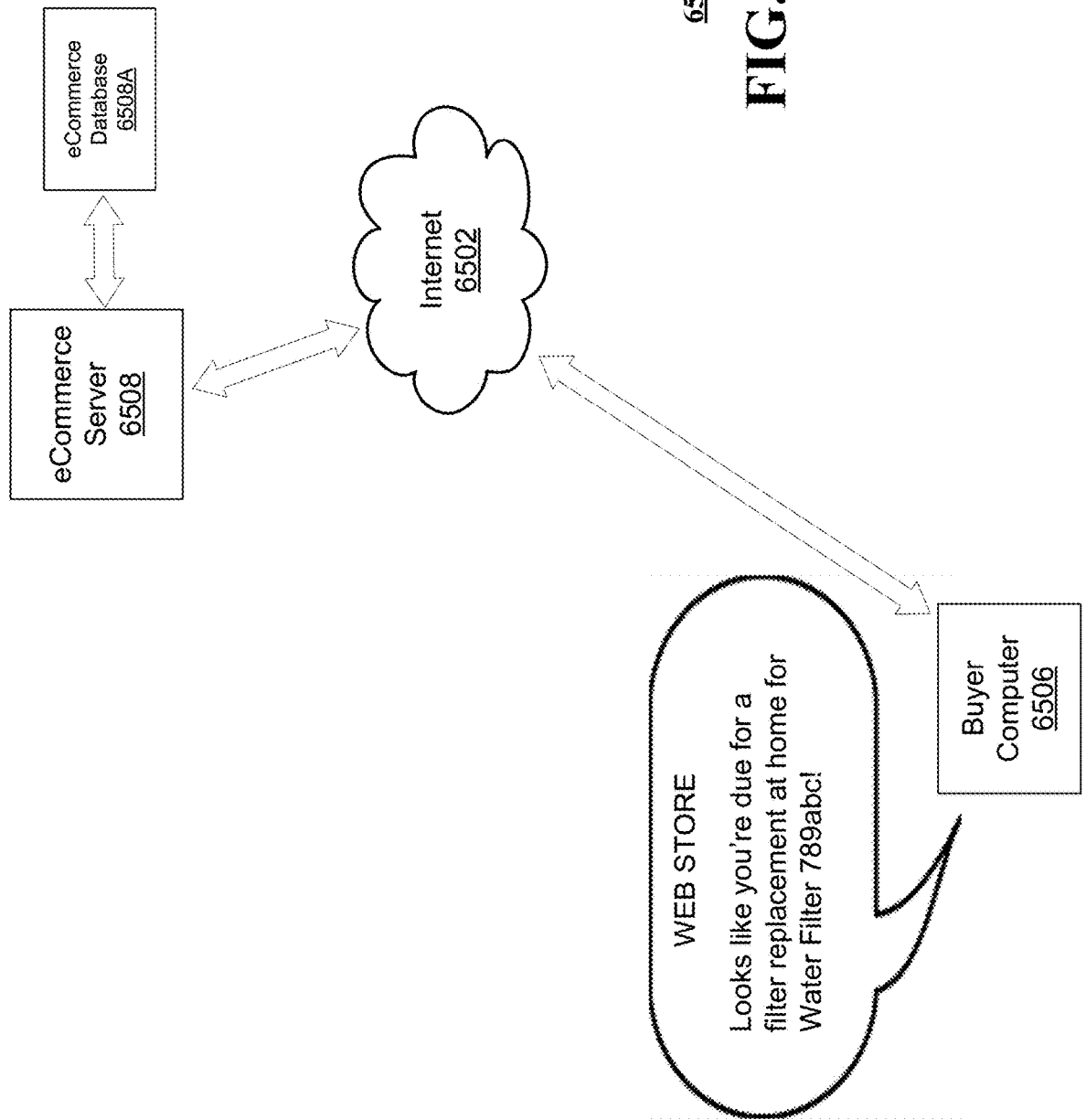
FIG. 2J is a block diagram illustrating an example, non-limiting embodiment of a system (all or part of which can, for example, function within the communication network of FIG. 1) in accordance with various aspects described herein (this FIG. 2J shows an example of a suggestion to purchase a product as a replacement for a previously purchased product).

Referring now to FIG. 2J, this is a block diagram illustrating an example, non-limiting embodiment of a system 6500 in accordance with various aspects described herein. In this example, system 6500 includes eCommerce Server 6508 and eCommerce Database 6508A (which can operate in a manner similar to eCommerce Server 4508 and eCommerce Database 4508A of FIG. 2F). Further, system 6500 includes Buyer Computer 6506 (which can operate in a manner similar to Buyer Computer 4506 of FIG. 2F). In this example, the Buyer Computer 6506 is used (in response to a buyer purchasing a first item) to provide a suggestion to the buyer for a replacement item (in this example, a replacement water filter). This suggestion can be presented to the buyer, for example, visually via a GUI display screen of the Buyer Computer 6506, audibly via a speaker of the Buyer Computer 6506, or a combination thereof. The buyer can respond to this suggestion, for example, by making a purchase.

Figure 2K:
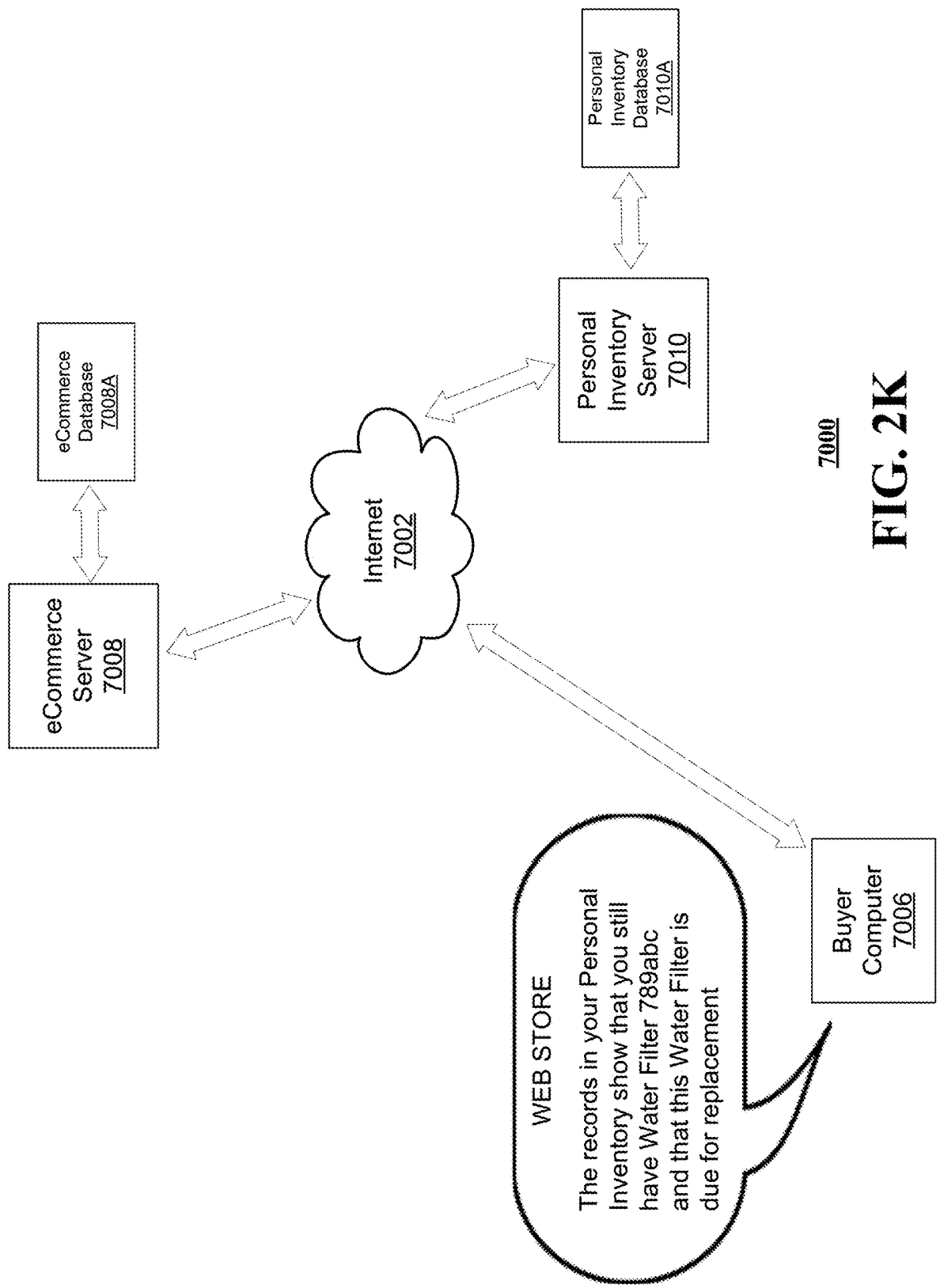
FIG. 2K is a block diagram illustrating an example, non-limiting embodiment of a system (all or part of which can, for example, function within the communication network of FIG. 1) in accordance with various aspects described herein (this FIG. 2K shows an example of a suggestion to purchase an item as a replacement for a previously purchased item).

Referring now to FIG. 2K, this is a block diagram illustrating an example, non-limiting embodiment of a system 7000 in accordance with various aspects described herein. In this example, system 7000 includes eCommerce Server 7008 and eCommerce Database 7008A (which can operate in a manner similar to eCommerce Server 4508 and eCommerce Database 4508A of FIG. 2F). Further, system 7000 includes Buyer Computer 7006 (which can operate in a manner similar to Buyer Computer 4506 of FIG. 2F). Further still, system 7000 includes Personal Inventory Server 7010 and Personal Inventory Database 7010A (which can operate in a manner similar to the personal inventory server and personal inventory database of one or more of FIGS. 2A-2D). In this example, the Buyer Computer 7006 is used (in response to a buyer having purchased a first item—as reflected in the Personal Inventory Database 7010A) to provide a suggestion to the buyer for a replacement item (in this example, a replacement water filter). This suggestion can be presented to the buyer, for example, visually via a GUI display screen of the Buyer Computer 7006, audibly via a speaker of the Buyer Computer 7006, or a combination thereof. The buyer can respond to this suggestion, for example, by making a purchase.

Reference will now be made to various examples associated with use of personal inventories according to aspects of one or more embodiments. In one example, each user can have associated therewith a respective personal inventory (e.g., Personal Inventory "A" associated with User "A"; Personal Inventory "B" associated with User "B"; Personal Inventory "C" associated with User "C"). Each personal inventory can be stored in one or more databases (see, e.g., Personal Inventory Database 2010A of FIG. 2A). When a new item is added to a personal inventory (e.g., a new item is added to Personal Inventory "A" associated with User "A"), the item can be recorded in the respective personal inventory database along with identifying information (such as serial number, model number and date of purchase). The addition of the item into the respective personal inventory database via such recording can be accomplished in a number of ways. In one example, the item can be added to the user's personal inventory responsive to the user entering the data manually (such as via a graphical user interface (running on a computer of the user) in operative communication with a personal inventory server (see, e.g., Personal Inventory Server 2010 of FIG. 2A). In another example, the item can be added to the respective personal inventory responsive to a bar code scanner being used by the user (such as, for example, via a smartphone) to scan the item (based upon the bar code scan, a query can be made of a product database (see, e.g., eCommerce Server 2008 and eCommerce Database 2008A of FIG. 2A) to retrieve item information, such as serial number and model number; the retrieved item information can then be added to the user's personal inventory. In another example, the item can be added to the personal inventory responsive to a personal inventory server running an application that queries all items of the user (see, e.g., elements 2012A, 2012B, 2012C, 2012D and 2012E of FIG. 2A) that are connected via a network of the user (such as a home network of the user and/or other network) to retrieve identifying information (that is, identifying information associated with the connected items) and store the results in the personal inventory database. Alternatively, or in addition, when a purchase is made, either online (see, e.g., User Computer 2006 of FIG. 2A) or at a physical store point-of-purchase (see, e.g., Point-of-Purchase Hardware 2004 of FIG. 2A), the user can be asked (e.g., at checkout) if the user wants to add the purchased item to their personal inventory. If so, the point-of-purchase (see, e.g., Point-of-Purchase Hardware 2004 of FIG. 2A) or the eCommerce server (see, e.g., eCommerce Server 2008 of FIG. 2A) can send inventory data (and/or product specification data) for the item to the user's personal inventory (see, e.g., Personal Inventory Database 2010A of FIG. 2A). In another example, an item can be deleted from the personal inventory of a user (such as by the user via a GUI). Such an item can be deleted from the personal inventory of the user when, for example, the user no longer has the item (e.g., the item is thrown away, given away, donated, lost or otherwise disposed of).

Still referring to various examples associated with use of personal inventories according to aspects of one or more embodiments, the personal inventory database (see, e.g., Personal Inventory Database 2010A of FIG. 2A) can be accessible via a network (such as through Personal Inventory Server 2010 of FIG. 2A). In one specific example, the personal inventory can be stored in the database with identifying entries such as shown in Table 1 below. As seen in Table 1, the fields of this example can include Serial Number, Model Number, Color, Purchase Date, Bought By (used to identify the person who made the purchase of the item), Owner (used to identify a person who is the primary owner (and/or user) of the item), and Location (used to indicate where the item is typically located). Further, non-electronic items and items that do not have network connectivity can also be stored in the personal inventory (entry of information associated with such items can be, for example, via manual entry and/or bar code scanning).

TABLE 1

| ITEM | Serial No. | Model No. | Color | Purchase Date | Bought By | Owner | Location |
|---|---|---|---|---|---|---|---|
| Automobile (Manufacturer - ABC) | xyz | 123 | grey | 21 Jan. 2019 | JIM | JIM | HOME |
| Refrigerator (Manufacturer - DEF) | wju | 345 | white | 23 Feb. 2016 | MEG | MEG | LAKE HOUSE |
| Camera (Manufacturer - GHI) | gse | 478 | white | 4 Mar. 2017 | MEG | MOM | MOM'S HOUSE |
| Smartphone (Manufacturer - JKL) | dre | 490 | white | 12 Mar. 2018 | JIM | MEG | HOME |
| TV (Manufacturer - MNO) | wtu | 670 | black | 12 Dec. 2018 | MEG | MEG | HOME |
| Sofa | ret | 456 | 6783 | 24 Dec. 2017 | MEG | MEG | HOME |
| Filing Cabinet | dfg | 765 | tan | 23 Sep. 2010 | JIM | JIM | LAKE HOUSE |
| Electric Toothbrush | ghj | 345 | white | 17 Mar. 2015 | JIM | DAD | DAD'S HOUSE |

Still referring to various examples associated with use of personal inventories according to aspects of one or more embodiments, with the personal inventory in place for a given user (such as described above), a virtual assistant (see, e.g., Virtual Assistant 2550 of FIG. 2B, Virtual Assistant 3050 of FIG. 2C, or the Virtual Assistant integrated into User Mobile Device 3506 of FIG. 2D) can now conduct communications (e.g., communications in parallel to an online shopping experience). In one example, this is accomplished by the virtual assistant monitoring page views which are made by the user (see, e.g., User Computer 2506 of FIG. 2B, User Computer 3006 of FIG. 2C, User Mobile Device 3506 of FIG. 2D) and comparing what is being viewed with information in the user's personal inventory (and/or with information in a product information server (see, e.g., the eCommerce Servers and eCommerce Databases of FIGS. 2A-2D).

Still referring to various examples associated with use of personal inventories according to aspects of one or more embodiments, a discussion will now be made of virtual assistant suggestions regarding product compatibility. In this example, a given user visits an online website and navigates to a product page. The product presented on the product page is identified by the model number/serial number and/or other identifying information, which is sent to the virtual assistant. The virtual assistant (see, e.g., Virtual Assistant 2550 of FIG. 2B) then sends the product information to the personal inventory server (see, e.g., the Personal Inventory Server 2510 and Personal Inventory Database 2510A of FIG. 2B), which may also communicate with a product information server (see, e.g., the eCommerce Server 2508 and eCommerce Database 2508A of FIG. 2B) to determine product compatibility. The personal inventory server compares data from the product page, the personal inventory database, and the product information server and returns a response to the virtual assistant to announce (e.g., via visual display and/or via audio output) compatibility information to the user.

Still referring to various examples associated with use of personal inventories according to aspects of one or more embodiments, a discussion will now be made of virtual assistant suggestions regarding a prior purchase. In this example, a given user visits an online website and navigates to a product page. The product presented on the product page is identified by the model number/serial number and/or other identifying information, which is sent to the virtual assistant. The virtual assistant (see, e.g., Virtual Assistant 3050 of FIG. 2C) then sends the product information to the personal inventory server (see, e.g., the Personal Inventory Server 3010 and Personal Inventory Database 3010A of FIG. 2C) to identify any related products. The personal inventory server compares data from the product page and the personal inventory database and returns a response to the virtual assistant to announce (e.g., via visual display and/or via audio output) related information to the user.

Still referring to various examples associated with use of personal inventories according to aspects of one or more embodiments, a discussion will now be made of virtual assistant suggestions in the context of an in-store shopping experience. In this example, a given user can use a bar code scanner app on the user's mobile device (see, e.g., User Mobile Device 3506 of FIG. 2D) to send the product information to the personal inventory server (see, e.g., the Personal Inventory Server 3510 and Personal Inventory Database 3510A of FIG. 2D). In this example, the user's mobile device can also operate as the virtual assistant. In this example, the personal inventory server can retrieve and process data from the product information server (see, e.g., the eCommerce Server 3508 and eCommerce Database 3508A of FIG. 2D) regarding the dimensions of the product that was scanned (of course, the dimensions are a specific example, and any desired product data (specification(s), review(s), etc.) can be retrieved and processed). The virtual assistant can then (after receiving the return information from the personal inventory server) provide (e.g., via visual display and/or via audio output) information and/or suggestions to the user.

Reference will now be made to various examples associated with use of time-projected advertising according to aspects of one or more embodiments. In this regard, it is noted that a purchase of a product at a point in time can be informative as to what product(s) might be needed later in time. This can require tracking and forecasting the age of the product and/or the age of the person for whom the product was purchased. Such tracking and forecasting can be accomplished using various embodiments described herein. In one example, when an advertisement and/or purchase recommendation is going to be made, an eCommerce or advertising server (see, e.g., eCommerce Servers and eCommerce Databases of FIGS. 2E-2K) can search past purchase history records (and/or a personal inventory database such as described herein) to make a time-appropriate choice for presentation of the advertisement and/or recommendation (e.g., make the specific advertisement and/or recommendation appropriate in view of the current age (since purchase) of one or more previously purchased products and/or appropriate in view of the current age of the purchaser and/or recipient (if the prior purchased item was a gift or the like).

Still referring to various examples associated with time-projected advertising according to aspects of one or more embodiments, in one example a user may make a purchase online (see, e.g., Buyer Computer 4506 of FIG. 2F) or at a physical point-of-purchase (see, e.g., Point-of-Purchase Hardware 4004 of FIG. 2E). When the purchase is made, the user can be prompted (e.g., visually via a display, via audio such as from a speaker, or a combination thereof) to indicate who the purchase is for (the user can input such information, for example, via a GUI and/or via spoken input). If the purchase is for someone other than the purchaser, the purchaser can provide another name. Optionally, the product user's age or age range at the time of purchase can be provided (e.g., via a GUI and/or via spoken input) by the purchaser. If an age or age range is not provided, an eCommerce server (see, e.g., eCommerce Servers and eCommerce Databases of FIGS. 2E-2K) could add an estimated age (or estimated age range) for the product user based on the average age (or average age range) of previous users of the product or a typical age (or typical age range) of users of the type of product. For example, if Buyer A buys a baby crib to be used by Susie Smith, Susie Smith may be estimated to be 0-6 months old. The product age at purchase is also recorded. If the product is new, the product can be recorded as such. Alternatively (or additionally), the date that the product was produced can be recorded. This may be particularly helpful if, for instance, a product was sold as new but was produced some significant amount of time prior. Likewise, a used product may have an estimated age that is recorded.

In one specific example, the purchase history of the buyer can be stored in a database with identifying entries such as shown in Table 2 below. As seen in Table 2, the fields of this example can include the Product User, the Product ID, the Purchase Date of the product, the Product User Age at purchase, and the Product Age at Purchase.

TABLE 2

| Buyer A Purchase History | | | | |
| --- | --- | --- | --- | --- |
| Product User | Product ID | Purchase Date | Product User Age at Purchase | Product Age at Purchase |
| Susie Smith | xyz123 | 6 Jan. 2019 | 0 yr 0 mo | 0 yr 0 mo |

Still referring to the baby crib example above, Buyer "A" may want to make a subsequent purchase for the same product user (in this case, Suzie Smith) at a date later in time, say one year later. An eCommerce server (see, e.g., eCommerce Servers and eCommerce Databases of FIGS. 2E-2K) can calculate an estimated current age for past product users for whom Buyer "A" has previously shopped. In this example, (see Table 3, below—which is an extension of Table 2) Susie Smith is now estimated to be 1 year old and recommendations and/or advertisements can be sent to Buyer A that are appropriate for that 1-year age.

TABLE 3

| Buyer A Purchase History | | | | | | |
| --- | --- | --- | --- | --- | --- | --- |
| Product User | Product ID | Purchase Date | Product User Age at Purchase | Product Age at Purchase | Estimated Product User Age | Estimated Product Age |
| Susie Smith | xyz123 | 6 Jan. 2019 | 0 yr 0 mo | 0 yr 0 mo | 1 yr 0 mo | 1 yr 0 mo |

In another example, and as another means by which to estimate age changes of a product user, the product user can have a virtual assistant device (or other app) that monitors the product user's voice changes, vocabulary changes, and/or context changes to detect maturity changes over time and update estimated ages accordingly.

Still referring to various examples associated with time-projected advertising according to aspects of one or more embodiments, in another example a buyer may purchase an item for themselves as the product user, but the buyer can provide a product tag to indicate how and/or where the product will be used (in this case, the age progression of the product is of more interest than the age progression of the product user). Table 4 below shows an example of such a purchase history that can be stored. As seen in Table 4, the fields of this example can include the Product Tag, the Product ID, the Purchase Date, the Product User Age at Purchase (the data being "N/A" in this example), and the Product Age at Purchase.

TABLE 4

Buyer A Purchase History

| Product Tag | Product ID | Purchase Date | Product User Age at Purchase | Product Age at Purchase |
|---|---|---|---|---|
| Home | 789abc | 6 Jan. 2019 | N/A | 0 yr 0 mo |
| My Deli | 567ghi | 12 Jan. 2019 | N/A | 0 yr 0 mo |

The data in Table 4 can be generated, for example, responsive to a retail Point-of-Purchase transaction (see, e.g., Point-of-Purchase Hardware 5504 of FIG. 2H) via which an in-store retail purchase of a commercial refrigerator for use in a deli is being made and/or responsive to an online purchase (see, e.g., Buyer Computer 6006 of FIG. 2I) via which a purchase (at a website) of a water filter for home use is being made.

Still referring to the water filter example above, the eCommerce server (see, e.g., eCommerce Server 6508 and eCommerce Database 6508A of FIG. 2J) may estimate that the water filter is now 2 months old and is due for a replacement. The eCommerce server can recommend a product and/or provide an advertisement to Buyer "A". In one example, the providing of the recommendation and/or the advertisement can be accomplished when Buyer "A" is actively shopping (e.g., actively browsing and/or purchasing online). In another example, the providing of the recommendation and/or the advertisement can be accomplished via a process wherein the eCommerce server periodically (or continually) monitors estimated product ages that match (or exceed) recommended or typical product replacement times and proactively sends an advertisement and/or a recommendation accordingly. In another example, the eCommerce server can scan purchase histories from other past buyers and/or otherwise identify trends. For instance, the eCommerce server can identify that buyers who buy SAT prep books typically buy GRE prep books 4 years later. Table 5 below (which is an extension of Table 4) shows another example of such a purchase history that can be stored. As seen in Table 5, the fields of this example can include the Product Tag, the Product ID, the Purchase Date, the Product User Age at Purchase (the data being "N/A" in this example), and the Product Age at Purchase. In addition, this Table 5 now includes Estimated Product User Age (the data being "N/A" in this example, and Estimated Product Age.

TABLE 5

Buyer A Purchase History

| Product Tag | Product ID | Purchase Date | Product User Age at Purchase | Product Age at Purchase | Estimated Product User Age | Estimated Product Age |
|---|---|---|---|---|---|---|
| Home | 789abc | 6 Jan. 2019 | N/A | 0 yr 0 mo | N/A | 0 yr 2 mo |

Still referring to various examples associated with time-projected advertising according to aspects of one or more embodiments, in another example the eCommerce server (see, e.g., eCommerce Server 7008 and eCommerce Database 7008A of FIG. 2K) can more intelligently determine if and how to send an advertisement and/or recommendation to the buyer (that is, the buyer who had previously purchased a particular item). In one example, this is accomplished by ensuring, for instance, that the buyer still has the previously-purchased item in their personal inventory (see, e.g., Personal Inventory Server 7010 and Personal Inventory Database 7010A of FIG. 2K). In one example, the eCommerce server (and/or personal inventory server) can periodically (or continually) make a determination to send an advertisement and/or recommendation to the buyer. This personal inventory of items can be created, updated and utilized as described in detail herein. In one specific example, prior to sending a recommendation and/or advertisement to the buyer (of the previously-purchased item), the eCommerce server can query the buyer's personal inventory database (e.g., via the personal inventory server) to confirm, for instance, that the buyer still owns the water filter—if not, the advertisement and/or recommendation may not be sent.

In another example, the eCommerce server (and/or the personal inventory server) can periodically (or continually) synchronize past purchases to determine which ones are still in use by the user and then use this information to make predictions about how long product lifespans are.

Figure 2L:
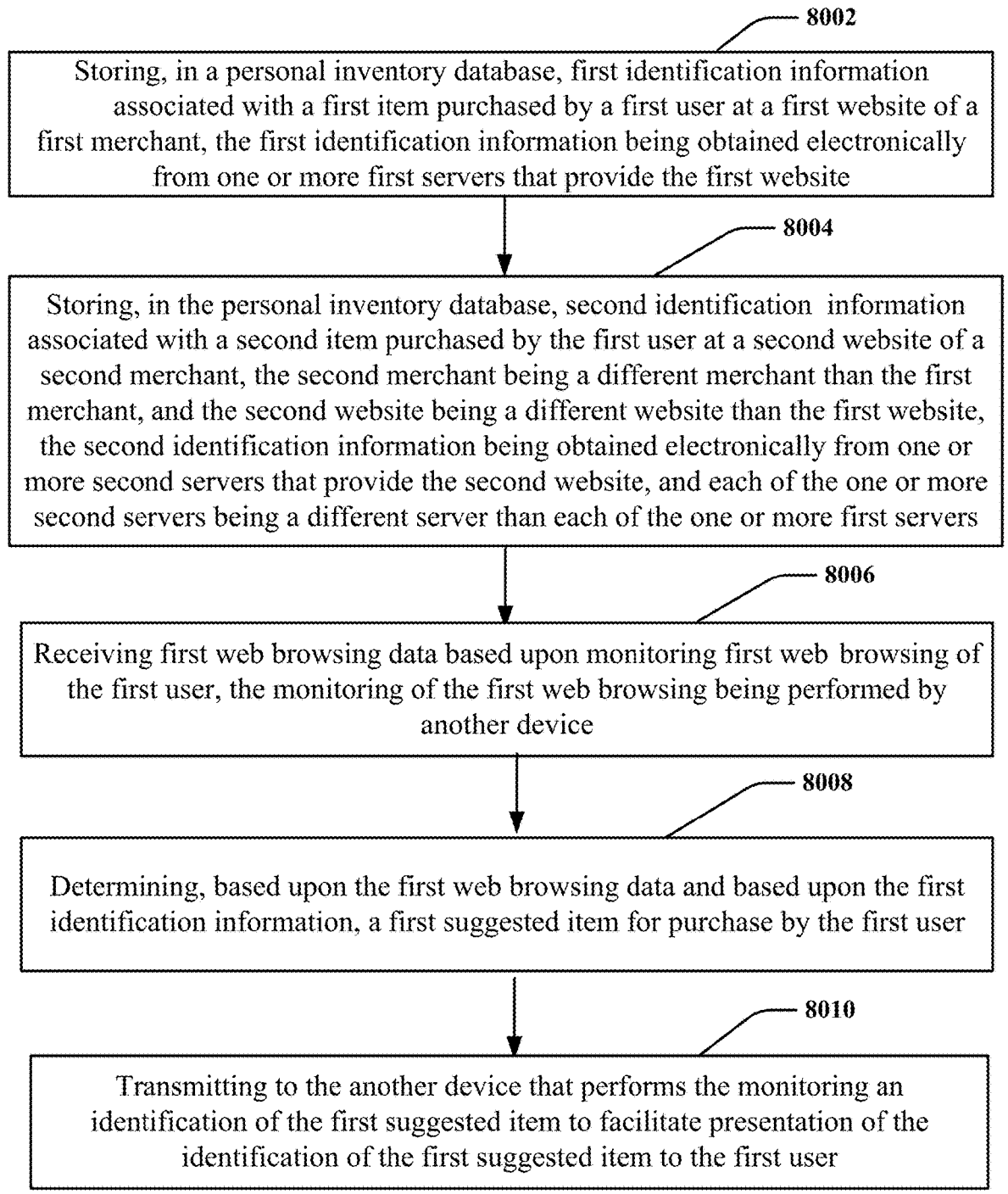
FIG. 2L depicts an illustrative embodiment of a method in accordance with various aspects described herein.

Referring now to FIG. 2L, various steps of a method 8000 according to an embodiment are shown. As seen in this FIG. 2L, step 8002 comprises storing, in a personal inventory database, first identification information associated with a first item purchased by a first user at a first website of a first merchant the first identification information being obtained electronically from one or more first servers that provide the first website. Next, step 8004 comprises storing, in the personal inventory database, second identification information associated with a second item purchased by the first user at a second website of a second merchant, the second merchant being a different merchant than the first merchant, and the second website being a different website than the first website, the second identification information being obtained electronically from one or more second servers that provide the second website, and each of the one or more second servers being a different server than each of the one or more first servers. Next, step 8006 comprises receiving first web browsing data based upon monitoring first web browsing of the first user, the monitoring of the first web browsing being performed by another device. Next, step 8008 comprises determining, based upon the first web browsing data and based upon the first identification information, a first suggested item for purchase by the first user. Next, step 8010 comprises transmitting to the another device that performs the monitoring an identification of the first suggested item to facilitate presentation of the identification of the first suggested item to the first user.

While for purposes of simplicity of explanation, the respective processes are shown and described as a series of blocks in FIG. 2L, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various examples, the monitoring the first web browsing can comprise monitoring page views by the first user and the determining the first suggested item for purchase by the first user can be based upon a relationship (e.g., a relationship among a browsed item displayed on one or more pages that are viewed by the first user during the first web browsing, the first item as identified by the first identification information, and the first suggested item for purchase). In various specific (non-limiting) examples, a relationship can comprise: an associated replacement part (e.g., a water filter for refrigerator); a consumable entity (e.g., a coffee pod); an enhancement or augmentation device (e.g., an improved game or game controller); a complete replacement for the original entity (e.g., car tire); or any combination thereof.

In various examples, a relationship can comprise a compatibility (e.g., among the first item, the browsed item, and the first suggested item). In various specific (non-limiting) examples, a compatibility can be based upon one or more of the following factors: similar size (e.g., XL shirt); same voltage (e.g., 12 volt DC sound system for use in your recreational vehicle); same or matching color; same or matching style (e.g., art deco, traditional); capacity (e.g., this carafe holds the same amount of liquid as that coffeemaker); function (e.g., this voltage tester matches the batteries you often purchase); or any combination thereof.

In other examples, a machine learning algorithm can be used for determining a relationship and/or a compatibility.

Figure 2M:
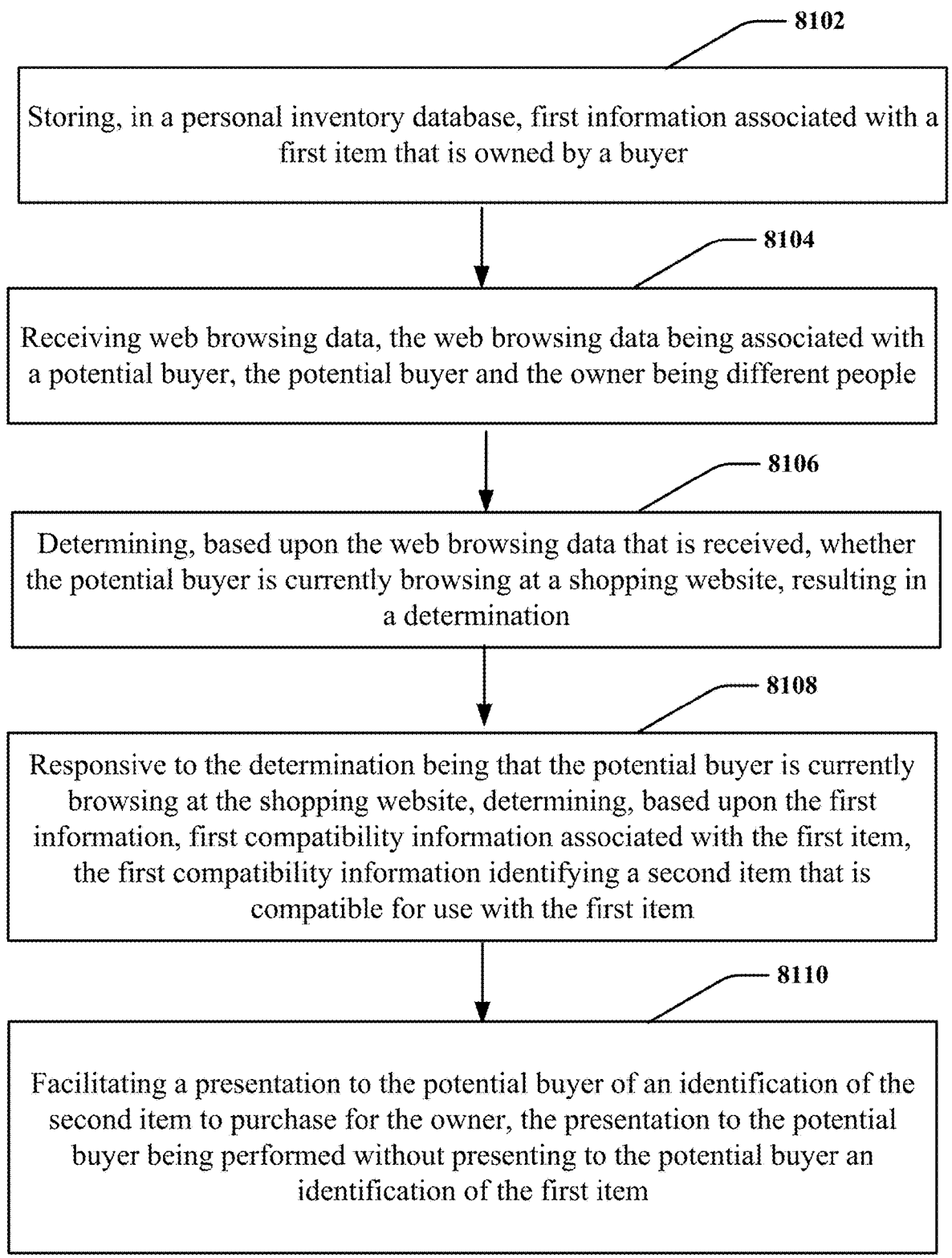
FIG. 2M depicts an illustrative embodiment of a method in accordance with various aspects described herein.

Referring now to FIG. 2M, various steps of a method 8100 according to an embodiment are shown. As seen in this FIG. 2M, step 8102 comprises storing, in a personal inventory database, first information associated with a first item that is owned by a buyer. Next, step 8104 comprises receiving web browsing data, the web browsing data being associated with a potential buyer, the potential buyer and the owner being different people. Next, step 8106 comprises determining, based upon the web browsing data that is received, whether the potential buyer is currently browsing at a shopping website, resulting in a determination. Next, step 8108 comprises responsive to the determination being that the potential buyer is currently browsing at the shopping website, determining, based upon the first information, first compatibility information associated with the first item, the first compatibility information identifying a second item that is compatible for use with the first item. Next, step 8110 comprises facilitating a presentation to the potential buyer of an identification of the second item to purchase for the owner, the presentation to the potential buyer being performed without presenting to the potential buyer an identification of the first item.

While for purposes of simplicity of explanation, the respective processes are shown and described as a series of blocks in FIG. 2M, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2N:
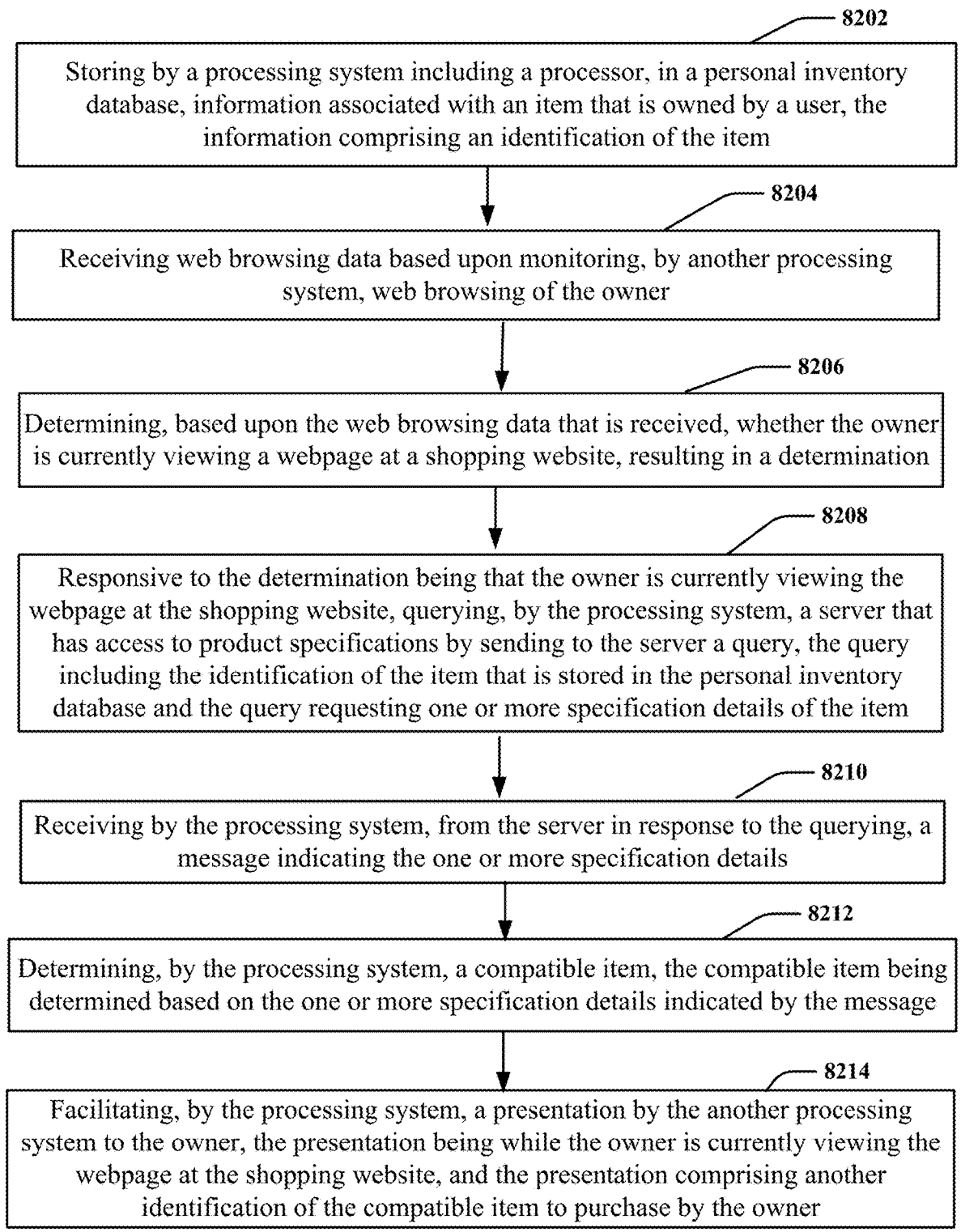
FIG. 2N depicts an illustrative embodiment of a method in accordance with various aspects described herein.
Figure 20:
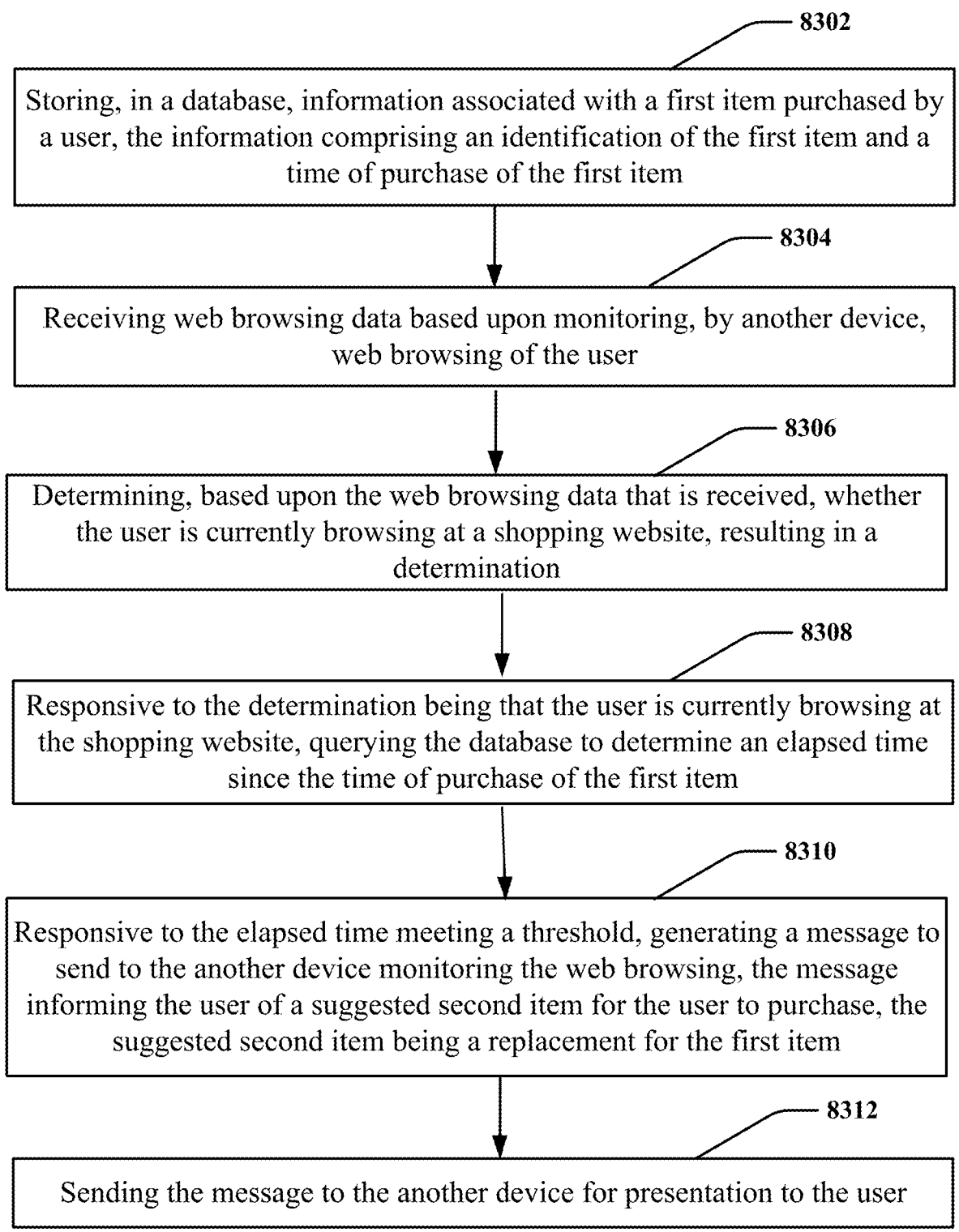

Referring now to FIG. 2N, various steps of a method 8200 according to an embodiment are shown. As seen in this FIG. 2N, step 8202 comprises storing by a processing system including a processor, in a personal inventory database, information associated with an item that is owned by a user, the information comprising an identification of the item. Next, step 8204 comprises receiving web browsing data based upon monitoring, by another processing system, web browsing of the owner. Next, step 8206 comprises determining, based upon the web browsing data that is received, whether the owner is currently viewing a webpage at a shopping website, resulting in a determination. Next, step 8208 comprises responsive to the determination being that the owner is currently viewing the webpage at the shopping website, querying, by the processing system, a server that has access to product specifications by sending to the server a query, the query including the identification of the item that is stored in the personal inventory database and the query requesting one or more specification details of the item. Next, step 8210 comprises receiving by the processing system, from the server in response to the querying, a message indicating the one or more specification details. Next, step 8212 comprises determining, by the processing system, a compatible item, the compatible item being determined based on the one or more specification details indicated by the message. Next, step 8214 comprises facilitating, by the processing system, a presentation by the another processing system to the owner, the presentation being while the owner is currently viewing the webpage at the shopping website, and the presentation comprising another identification of the compatible item to purchase by the owner.

In various examples, determining whether someone is currently browsing (or shopping) at a shopping (or eCommerce) website can be based upon a uniform resource locator (URL) of the shopping (or eCommerce) website. In other examples, determining whether someone is viewing a webpage at a shopping (or eCommerce) website can be based upon the URL of the webpage. In other examples, the term currently browsing (or shopping or viewing or the like) can refer to actions that are happening in real-time or almost real-time. In one specific example, currently performing an action can be determined if the action was performed within a past time threshold (e.g., with in the past 10 seconds, within the past 30 seconds, within the past minute, within the past 10 minutes).

While for purposes of simplicity of explanation, the respective processes are shown and described as a series of blocks in FIG. 2N, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2O, various steps of a method 8300 according to an embodiment are shown. As seen in this FIG. 2O, step 8302 comprises storing, in a database, information associated with a first item purchased by a user, the information comprising an identification of the first item and a time of purchase of the first item. Next, step 8304 comprises receiving web browsing data based upon monitoring, by another device, web browsing of the user. Next, step 8306 comprises determining, based upon the web browsing data that is received, whether the user is currently browsing at a shopping website, resulting in a determination. Next, step 8308 comprises responsive to the determination being that the user is currently browsing at the shopping website, querying the database to determine an elapsed time since the time of purchase of the first item. Next, step 8310 comprises responsive to the elapsed time meeting a threshold, generating a message to send to the another device monitoring the web browsing, the message informing the user of a suggested second item for the user to purchase, the suggested second item being a replacement for the first item. Next, step 8312 comprises sending the message to the another device for presentation to the user.

While for purposes of simplicity of explanation, the respective processes are shown and described as a series of blocks in FIG. 2O, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2P:
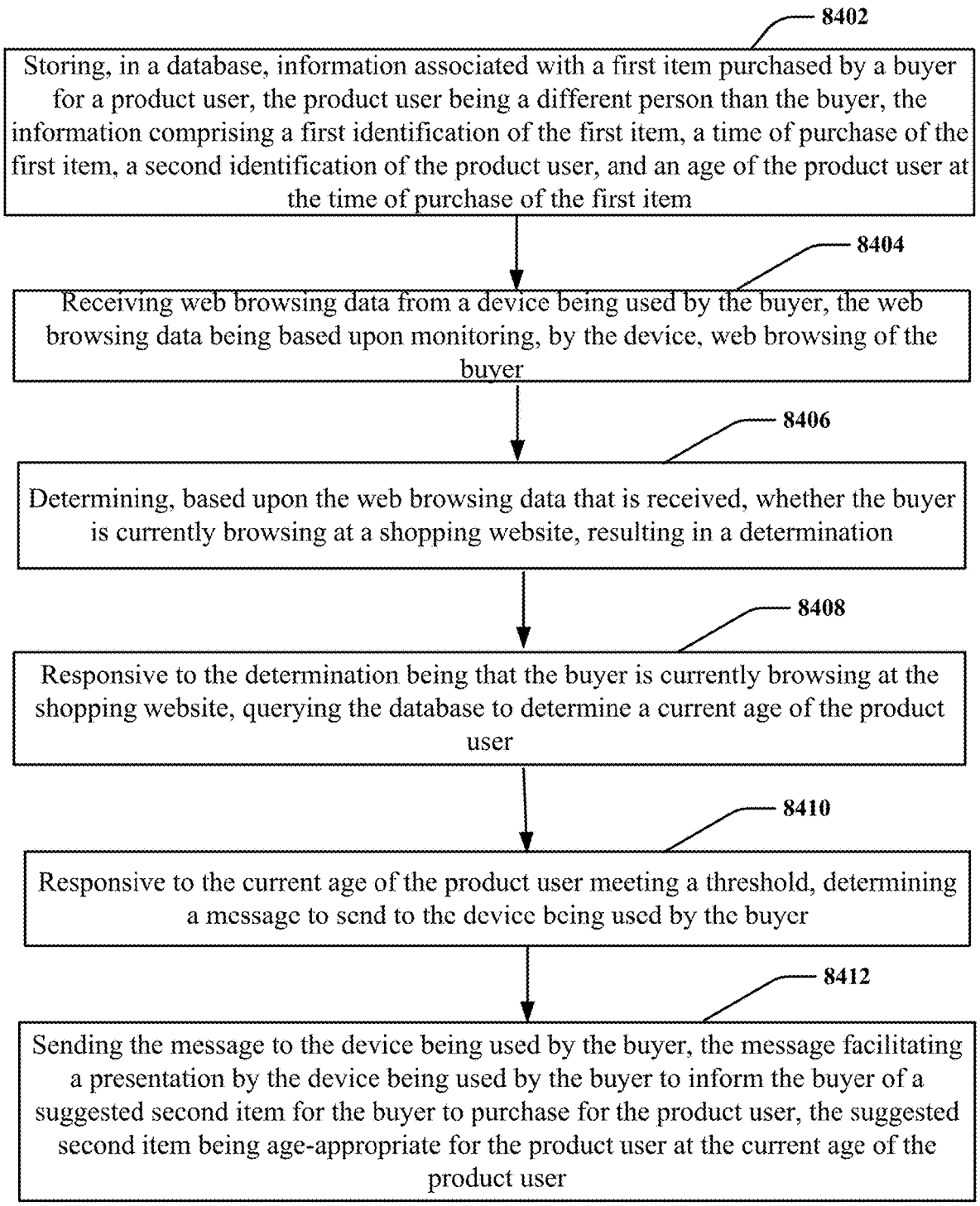
FIG. 2P depicts an illustrative embodiment of a method in accordance with various aspects described herein.

Referring now to FIG. 2P, various steps of a method 8400 according to an embodiment are shown. As seen in this FIG. 2P, step 8402 comprises storing, in a database, information associated with a first item purchased by a buyer for a product user, the product user being a different person than the buyer, the information comprising a first identification of the first item, a time of purchase of the first item, a second identification of the product user, and an age of the product user at the time of purchase of the first item. Next, step 8404 comprises receiving web browsing data from a device being used by the buyer, the web browsing data being based upon monitoring, by the device, web browsing of the buyer. Next, step 8406 comprises determining, based upon the web browsing data that is received, whether the buyer is currently browsing at a shopping website, resulting in a determination. Next, step 8408 comprises responsive to the determination being that the buyer is currently browsing at the shopping website, querying the database to determine a current age of the product user. Next, step 8410 comprises responsive to the current age of the product user meeting a threshold, determining a message to send to the device being used by the buyer. Next, step 8412 comprises sending the message to the device being used by the buyer, the message facilitating a presentation by the device being used by the buyer to inform the buyer of a suggested second item for the buyer to purchase for the product user, the suggested second item being age-appropriate for the product user at the current age of the product user.

While for purposes of simplicity of explanation, the respective processes are shown and described as a series of blocks in FIG. 2P, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2Q:
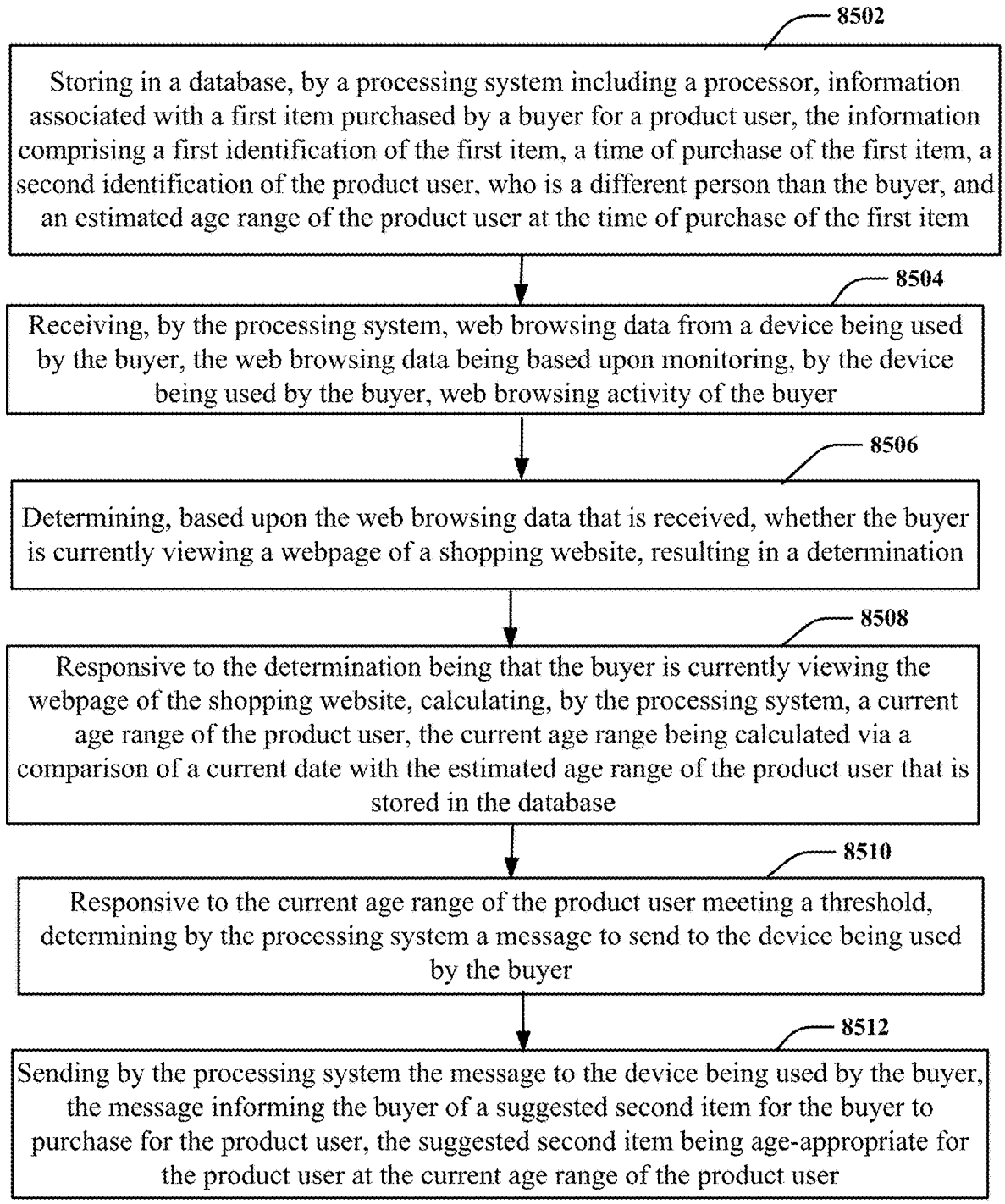
FIG. 2Q depicts an illustrative embodiment of a method in accordance with various aspects described herein.

Referring now to FIG. 2Q, various steps of a method 8500 according to an embodiment are shown. As seen in this FIG. 2Q, step 8502 comprises storing in a database, by a processing system including a processor, information associated with a first item purchased by a buyer for a product user, the information comprising a first identification of the first item, a time of purchase of the first item, a second identification of the product user, who is a different person than the buyer, and an estimated age range of the product user at the time of purchase of the first item. Next, step 8504 comprises receiving, by the processing system, web browsing data from a device being used by the buyer, the web browsing data being based upon monitoring, by the device being used by the buyer, web browsing activity of the buyer. Next, step 8506 comprises determining, based upon the web browsing data that is received, whether the buyer is currently viewing a webpage of a shopping website, resulting in a determination. Next, step 8508 comprises responsive to the determination being that the buyer is currently viewing the webpage of the shopping website, calculating, by the processing system, a current age range of the product user, the current age range being calculated via a comparison of a current date with the estimated age range of the product user that is stored in the database. Next, step 8510 comprises responsive to the current age range of the product user meeting a threshold, determining by the processing system a message to send to the device being used by the buyer. Next, step 8512 comprises sending by the processing system the message to the device being used by the buyer, the message informing the buyer of a suggested second item for the buyer to purchase for the product user, the suggested second item being age-appropriate for the product user at the current age range of the product user.

While for purposes of simplicity of explanation, the respective processes are shown and described as a series of blocks in FIG. 2Q, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a personal inventory of a given person can have public and/or private aspects (e.g., one or more parts of the personal inventory can be kept hidden from other people, while one or more other parts of the personal inventory can be available for viewing by the other people.

In various embodiments, public and/or private aspects of a personal inventory of a given person can be subject to opt-in and/or opt-out.

In various embodiments, one or more suggestions and/or recommendations related to a purchase for a given user can be made to one or more other people without revealing that given user's full personal inventory.

In various embodiments, one or more suggestions and/or recommendations related to what not to purchase for a given user can be made to one or more other people without revealing that given user's full personal inventory.

In one specific example, a given user's personal inventory can be hidden from view by other users, wherein compatibility information based on the personal inventory of the given user can be shared with the other users.

In various embodiments, a given user's residence can be part of that user's personal inventory (e.g., number and/or size of rooms in a home/apartment, dimensions, what appliances the user has).

In various embodiments, a suggestion and/or a recommendation can be made based on a size of an existing appliance and a size of a potential replacement appliance.

In various embodiments, each individual purchase can be included or not included in a personal inventory (e.g., opt-in or opt-out) on a purchase-by-purchase basis.

In various embodiments, a virtual assistant can give knowledge on the go (e.g., as a user browses a web page).

In various embodiments, compatibility can be based on user feedback (from one or more users). Such user feedback can include reviews and/or explicit compatibility information.

In various embodiments, purchases can be of services (instead of or in addition to products).

In various embodiments, suggestions, recommendations and/or advertisements can be directed to services (instead of or in addition to products).

In various embodiments, compatibility (between products) can be learned. In one specific example, compatibility can be learned by machine learning (ML), such as based on other user purchases and/or based on specification data. In another specific example, compatibility can be learned by artificial intelligence (AI), such as based on other user purchases and/or based on specification data.

In various embodiments, compatibility can be determined from manufacturer information (e.g., specific compatibility information and/or specification data). In one specific example, the manufacturer information can come from a manufacturer website.

In various embodiments, one or more Internet-Of-Things (IOT) devices can be used to create a personal inventory (e.g., be included in the personal inventory).

In various embodiments, a personal inventory system can keep out one or more e-commerce systems.

In various embodiments, a personal inventory for a given user can be across retailers (e.g., across e-retailers).

In various embodiments, one person can select a particular personal inventory (e.g., a particular personal inventory of another particular person) from among a plurality of personal inventories of a plurality of people to use for generating one or more recommendations or the like.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100 presented in FIG. 1, some or all of the subsystems and functions of the systems presented in FIGS. 2A-2K, and some or all of the methods presented in FIGS. 2L-2Q. For example, virtualized communication network 300 can facilitate in whole or in part storage of personal inventory data and/or provision of shopping suggestions as described herein.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
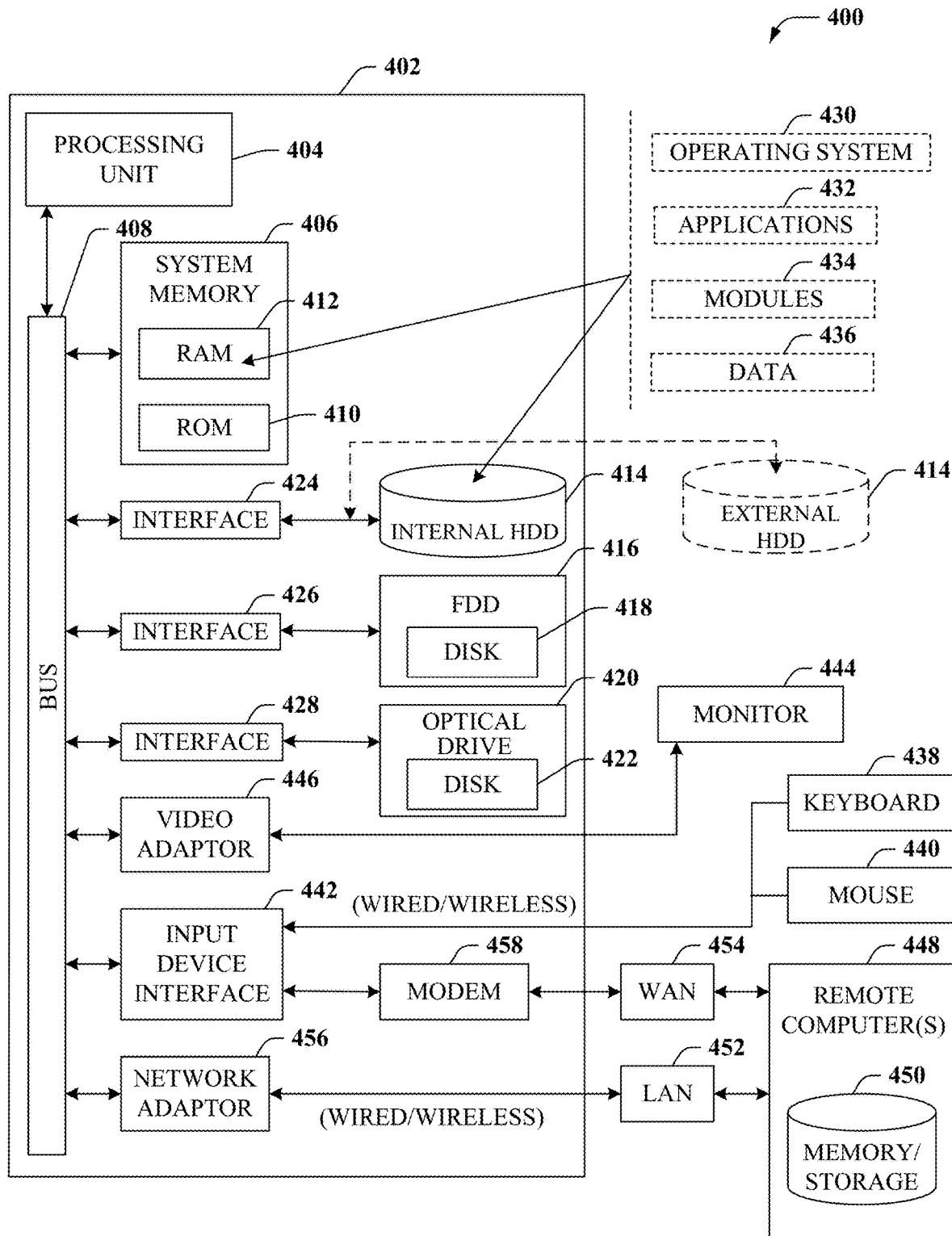
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part storage of personal inventory data and/or provision of shopping suggestions as described herein.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
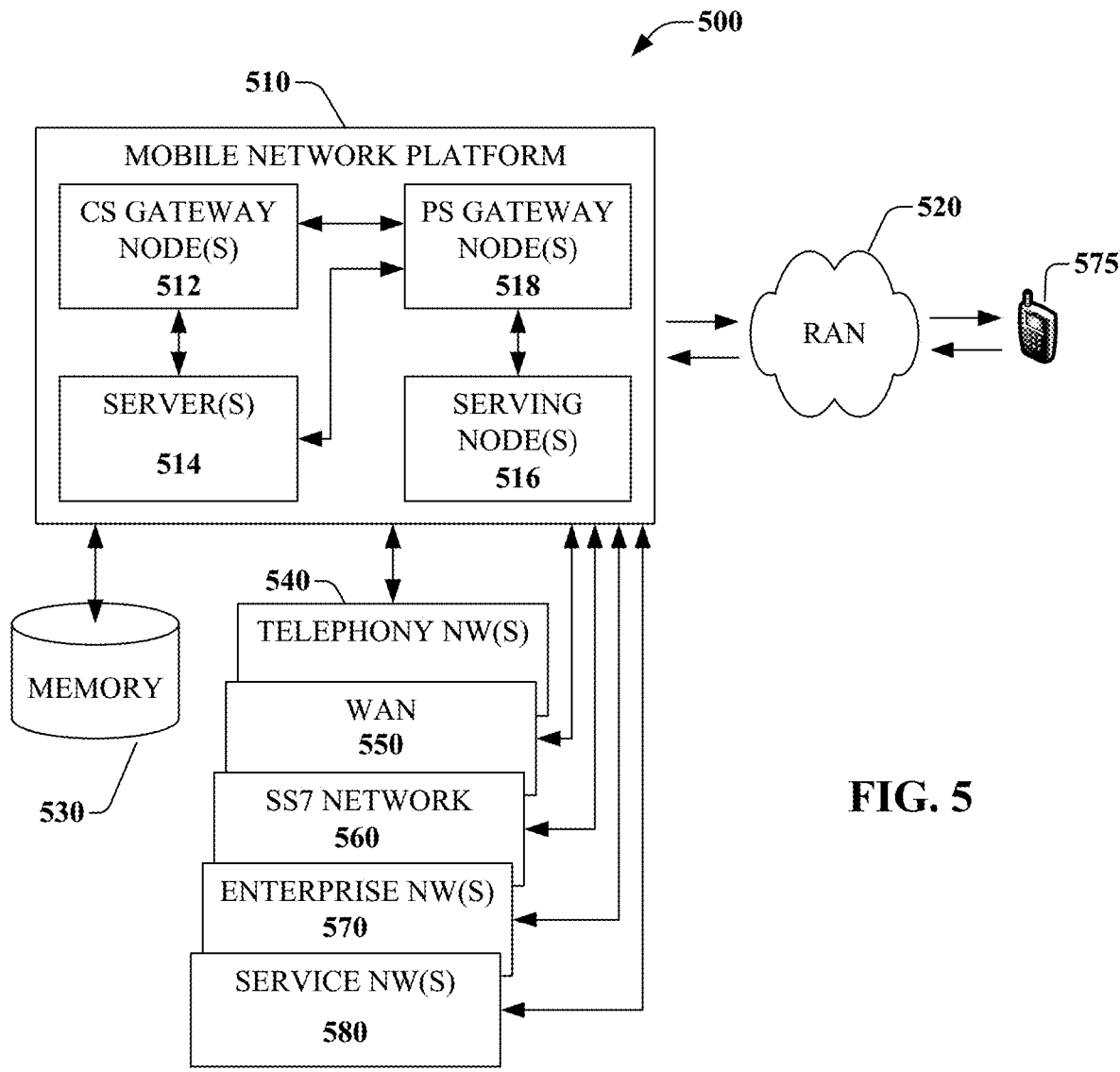
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part storage of personal inventory data and/or provision of shopping suggestions as described herein. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
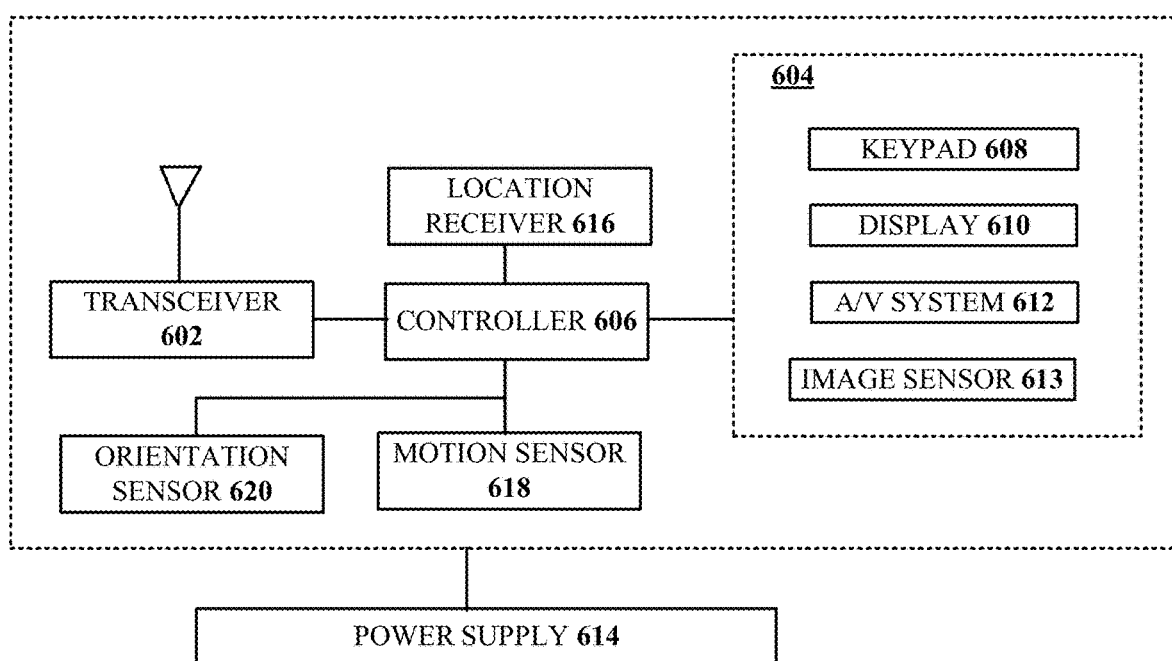
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part storage of personal inventory data and/or provision of shopping suggestions as described herein.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth©, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In other examples, location services can be implemented via WiFi signals, Bluetooth signals (standard and/or Low-Energy versions), and/or other localized radio beacons to replace or supplement GPS location information (in particular, GPS often does not provide useful location information inside buildings, especially multi-story buildings, so these other signals can be used to provide more precise information using databases of stored locations). In still other examples, new 5G radio systems operating at the higher frequencies designated for 5G will also be able to provide more precise supplementary location information and can be utilized in this regard.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically storing personal inventory data and/or provision of shopping suggestions as described herein) can employ various AI-based schemes for carrying out various embodiments thereof. Moreover, the classifier can be employed to determine a ranking or priority of each shopping suggestion. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
a processing system including a processor; and
a memory that stores executable instructions that, when executed by the processing system, facilitate performance of operations, the operations comprising:
receiving, over a communication network, first information representative of a bar code associated with a first item from a mobile device, wherein the mobile device scans the bar code associated with the first item;
accessing second information associated with the first item based on the first information representative of the bar code;
storing, in a database, the second information associated with the first item, wherein the first item was purchased by a user utilizing the mobile device associated with the user, the second information comprising an identification of the first item and a time of purchase of the first item;
receiving, from the mobile device over the communication network, web browsing data based upon monitoring, by the mobile device, web browsing of the user;
determining, based upon the web browsing data that is received, whether the user is currently browsing at a shopping website utilizing the mobile device, resulting in a determination;
responsive to the determination being that the user is currently browsing at the shopping website utilizing the mobile device, querying the database to determine an elapsed time since the time of purchase of the first item;
responsive to the elapsed time meeting a threshold, generating a message to send to a virtual assistant, the message informing the user of a suggested second item for the user to purchase, the suggested second item being a replacement for the first item; and
sending, over the communication network, the message to the virtual assistant for presentation to the user, wherein the virtual assistant comprises a stand-alone device including a speaker, wherein the virtual assistant is separate from the mobile device, wherein the virtual assistant provides the message over the speaker.

2. The device of claim 1, wherein the first item has a predetermined useful life, and wherein the message is generated based upon the predetermined useful life and the elapsed time in order to provide notification to the user of the suggested second item as the replacement for the first item at an end of the predetermined useful life of the first item.

3. The device of claim 2, wherein the determining is performed periodically.

4. The device of claim 2, wherein the determining is performed daily, weekly, monthly, or yearly.

5. The device of claim 1, wherein the time of purchase of the first item is stored as a calendar day.

6. The device of claim 1, wherein the elapsed time is determined as a number of days, a number of weeks, or a number of years.

7. The device of claim 1, wherein the meeting the threshold comprises the elapsed time being equal to or greater than the threshold.

8. The device of claim 1, wherein the message comprises an advertisement, a recommendation, or a combination thereof.

9. The device of claim 1, wherein the second information is obtained from the mobile device over the communication network responsive to the user purchasing the first item.

10. The device of claim 1, wherein the virtual assistant comprises a graphical user interface GUI, wherein the GUI presents the message.

11. The device of claim 1, wherein the accessing of the second information comprises obtaining the second information electronically from a server of a merchant that sold the first item over the communication network.

12. The device of claim 1, wherein the accessing of the second information comprises obtaining the second information electronically from a website at which the first item was purchased over the communication network.

13. The device of claim 1, wherein the operations comprise determining that the suggested second item fits in a space associated with the suggest second item according to dimensions of the space associated with the suggested second item.

14. The device of claim 13, wherein the message indicates that the suggested second item fits in the space associated with the suggested second item.

15. A non-transitory, machine-readable medium comprising executable instructions that, when executed by a processing system including a processor, facilitate performance of operations, the operations comprising:
receiving, over a communication network, first information representative of a bar code associated with a first item from a mobile device, wherein the mobile device scans the bar code associated with the first item;
accessing second information associated with the first item based on the first information representative of the bar code;
storing, in a database, the second information associated with the first item purchased by a buyer utilizing the mobile device associated with the buyer for a product user, the product user being a different person than the buyer, the second information comprising a first identification of the first item, a time of purchase of the first item, a second identification of the product user, and an age of the product user at the time of purchase of the first item;
receiving web browsing data from the mobile device being used by the buyer over the communication network, the web browsing data being based upon monitoring, by the mobile device, web browsing of the buyer;
determining, based upon the web browsing data that is received, whether the buyer is currently browsing at a shopping website utilizing the mobile device, resulting in a determination;

responsive to the determination being that the buyer is currently browsing at the shopping website, querying the database to determine a current age of the product user;

responsive to the current age of the product user meeting a threshold, determining a message to send to a virtual assistant associated with the buyer; and sending, over the communication network, the message to the virtual assistant associated with the buyer, the message presented by the virtual assistant associated with the buyer to inform the buyer of a suggested second item for the buyer to purchase for the product user, the suggested second item being age-appropriate for the product user at the current age of the product user, wherein the virtual assistant comprises a stand-alone device including a speaker, wherein the virtual assistant is separate from the mobile device, wherein the virtual assistant provide the message over the speaker.

16. The non-transitory, machine-readable medium of claim 15, wherein the determining is performed daily, weekly, monthly, or yearly.

17. The non-transitory, machine-readable medium of claim 15, wherein:
the age of the product user that is stored in the database is stored as a first calendar day;
the current age of the product user is a second calendar day; and
the meeting the threshold comprises the current age of the product user being equal to or greater than a predetermined value.

18. The non-transitory, machine-readable medium of claim 15, wherein the message comprises an advertisement, a recommendation, or a combination thereof.

19. A method comprising:
receiving, by a processing system including a processor, over a communication network, first information representative of a bar code associated with a first item from a mobile device, wherein the mobile device scans the bar code associated with the first item;
accessing, by the processing system, second information associated with the first item based on the first information representative of the bar code;
storing in a database, by the processing system, the second information associated with the first item purchased by a buyer utilizing the mobile device associated with the buyer for a product user, the second information comprising a first identification of the first item, a time of purchase of the first item, a second identification of the product user, who is a different person than the buyer, and an estimated age range of the product user at the time of purchase of the first item;

receiving, by the processing system, web browsing data from the mobile device being used by the buyer over the communication network, the web browsing data being based upon monitoring, by the mobile device associated with the buyer, web browsing activity of the buyer;

determining, by the processing system, based upon the web browsing data that is received, whether the buyer is currently viewing a webpage of a shopping website utilizing the mobile device, resulting in a determination;

responsive to the determination being that the buyer is currently viewing the webpage of the shopping website utilizing the mobile device, calculating, by the processing system, a current age range of the product user, the current age range being calculated via a comparison of a current date with the estimated age range of the product user that is stored in the database;

responsive to the current age range of the product user meeting a threshold, determining, by the processing system, a message to send to a virtual assistant associated with the buyer; and sending the message, by the processing system, over the communication network, to the virtual assistant associated with the buyer, the message informing the buyer of a suggested second item for the buyer to purchase for the product user, the suggested second item being age-appropriate for the product user at the current age range of the product user, wherein the virtual assistant comprises a stand-alone device including a speaker, wherein the virtual assistant is separate from the mobile device, wherein the virtual assistant provides the message over the speaker.

20. The method of claim 19, further comprising determining, by the processing system, the estimated age range of the product user, wherein the determining the estimated age range of the product user comprises estimating the estimated age range based upon the first item being a type of product, the type of product being one of an infant product that is age-appropriate for an infant, a toddler product that is age-appropriate for a toddler, a child product that is age-appropriate for a child, or a teen product that is age-appropriate for a teen.

* * * * *